(12) United States Patent
Lee et al.

(10) Patent No.: US 12,685,681 B2
(45) Date of Patent: Jul. 21, 2026

(54) AUTOMATIC SELECTABLE SLIDING DECK SYSTEM FOR WHEELCHAIR USER

(71) Applicant: GM Global Technology Operations LLC, Detroit, MI (US)

(72) Inventors: Junetaek Lee, Ganghwa-gun (KR); Bongbum Back, Incheon (KR); Jaeyun Lee, Incheon (KR); Hanseung Lee, Bucheon City (KR); Suhyun Lee, Seoul (KR); Yejin Seo, Seoul (KR); Taekyung Kim, Seongnam-si (KR)

(73) Assignee: GM Global Technology Operations LLC, Detroit, MI (US)

( * ) Notice: Subject to any disclaimer, the term of this patent is extended or adjusted under 35 U.S.C. 154(b) by 293 days.

(21) Appl. No.: 18/457,869

(22) Filed: Aug. 29, 2023

(65) Prior Publication Data

US 2025/0073098 A1      Mar. 6, 2025

(51) Int. Cl.
A61G 3/06 (2006.01)
B60P 1/44 (2006.01)
B60R 5/04 (2006.01)

(52) U.S. Cl.
CPC ............ A61G 3/062 (2013.01); B60P 1/4407 (2013.01); B60R 5/041 (2013.01); *Y10S 414/134* (2013.01)

(58) Field of Classification Search
CPC ... A61G 3/062; B60P 1/4407; Y10S 414/134; B60R 5/041
USPC ........................................ 414/522, 541, 921
See application file for complete search history.

(56) References Cited

U.S. PATENT DOCUMENTS

| | | | | | |
|---|---|---|---|---|---|
| 3,807,592 | A | * | 4/1974 | Lynn | B60R 5/00 414/537 |
| 5,533,771 | A | * | 7/1996 | Taylor | B60P 1/435 296/61 |
| 6,825,628 | B2 | * | 11/2004 | Heigl | A61G 3/061 414/921 |
| 7,978,119 | B2 | * | 7/2011 | Heigl | E05F 15/40 381/86 |
| 8,075,239 | B2 | * | 12/2011 | Hanzel | B60R 7/08 296/26.1 |
| 9,439,050 | B2 | * | 9/2016 | Ward | H04L 41/0886 |
| 12,017,617 | B2 | * | 6/2024 | Pilkington | B60R 9/042 |

(Continued)

FOREIGN PATENT DOCUMENTS

| | | | |
|---|---|---|---|
| DE | 20212907 | U1 | 11/2002 |
| DE | 102020206943 | A1 | 12/2021 |

(Continued)

*Primary Examiner* — James Keenan
(74) *Attorney, Agent, or Firm* — Honigman LLP; Matthew H. Szalach

(57) ABSTRACT

A cargo lift system for a vehicle includes a frame system, a deck system, and a cargo hook. The frame system is configured to be attached to the vehicle. The deck system includes a deck frame having a plurality of deck frame segments. The deck system is operable to translate along the frame system in (i) a first deployment mode where the deck frame segments cooperate to define a rigid support platform and (ii) a second deployment mode where the deck frame segments articulate to a lift position adjacent to a ground surface associated with the vehicle The cargo hook is attached to the deck system and operable to move between an extended state and a retracted state.

18 Claims, 19 Drawing Sheets

(56)　　　　　　References Cited

U.S. PATENT DOCUMENTS

2009/0016866　A1 *　　1/2009　Zaragoza　.............　A61G 3/0209
　　　　　　　　　　　　　　　　　　　　　　　414/541
2014/0333082　A1　　11/2014　Smith et al.
2015/0305952　A1　　10/2015　Nishiyama et al.
2017/0340493　A1 *　11/2017　Sidhu　.....................　B60P 1/435

FOREIGN PATENT DOCUMENTS

JP　　　　　2003298259　A　*　10/2023
KR　　　　　　200358147　Y1　*　　8/2004　　.............　H05B 41/36

* cited by examiner

AUTOMATIC SELECTABLE SLIDING DECK SYSTEM FOR WHEELCHAIR USER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a cargo lift system for a motor vehicle, and more particularly, to an automatic selectable sliding deck system for wheelchair users.

Unoccupied mobility equipment (e.g. wheelchairs, scooters, and the like) may be transported in a vehicle. Typically, the mobility equipment is loaded into a storage compartment area within the vehicle (e.g. the rear portion of a mini-van, the rear portion of a full-sized van, the trunk of a car, the bed of a truck, or the like) by a lifting device. Although generally adequate for short-term installations, some users may wish to supplement the recommended installation arrangement. Typically, a supplemental installation arrangement may further include additional support bolts (not shown) added to the recommended installation arrangement, such as 10 mm or 12 mm bolts. In order for this supplemental installation arrangement to take place, the vehicle is typically modified. Such modifications may be costly or intrusive, and may require permanent modification to the vehicle structure. Accordingly, it is apparent that there is a need for a vehicle cargo lift system that eases installation and provides improved functionality.

SUMMARY

An aspect of the disclosure includes a cargo lift system for a vehicle. The cargo lift system includes a frame system configured to be attached to the vehicle. The cargo lift system further includes a deck system including a deck frame having a plurality of deck frame segments, the deck system operable to translate along the frame system in (i) a first deployment mode where the deck frame segments cooperate to define a rigid support platform and (ii) a second deployment mode where the deck frame segments articulate to a lift position adjacent to a ground surface associated with the vehicle. The cargo lift system further includes a cargo hook attached to the deck system and operable to move between an extended state and a retracted state.

This aspect of the disclosure may include one or more of the following optional features. In some examples, the frame system includes a base frame configured to be attached to the vehicle, a base rail attached to the base frame, and an intermediate rail slidably attached to the base rail. In some examples, the plurality of deck frame segments are slidably attached to the intermediate rail. In some implementations, the plurality of deck frame segments includes a first deck frame segment slidably attached to the intermediate rail, a second deck frame segment attached to the first deck frame segment and configured to slide along the intermediate rail and articulate relative to the first deck frame segment, and a third deck frame segment attached to the second deck frame segment and configured to slide along the intermediate rail and articulate relative to the second deck frame segment.

In some configurations, the second deck frame segment is pivotally attached to the first deck frame segment at a first deck frame joint and the third deck frame segment is pivotally attached to the second deck frame segment at a second deck frame joint. In some examples, the frame system includes an actuator system operable to translate the deck system along the frame system. In some implementations, the intermediate rail includes a retainer operable between a first position to restrict movement of the deck frame relative to the intermediate rail and a second position to permit movement of the deck frame relative to the intermediate rail. In some examples, the retainer is operable to permit movement of the intermediate rail relative to the base rail in the first position and to restrict movement of the intermediate rail relative to the base rail in the second position.

In some examples, the deck system further includes a control system operable to instruct the cargo lift system to move between a deployed configuration and a stowed configuration. In some configurations, the control system includes a key fob including a dual-purpose button operable to send first instructions for operating the vehicle when engaged for a first period of a time and to send instructions for operating the cargo lift system when engaged for a second period of time that is longer than the first period of time.

Another aspect of the disclosure provides a vehicle including a cargo lift system. The cargo lift system includes a frame system configured to be attached to the vehicle. The cargo lift system further includes a deck system including a deck frame having a plurality of deck frame segments, the deck system operable to translate along the frame system in (i) a first deployment mode where the deck frame segments cooperate to define a rigid support platform and (ii) a second deployment mode where the deck frame segments articulate to a lift position adjacent to a ground surface associated with the vehicle. The cargo lift system further includes a cargo hook attached to the deck system and operable to move between an extended state and a retracted state.

This aspect of the disclosure may include one or more of the following optional features. In some examples, the frame system includes a base frame configured to be attached to the vehicle, a base rail attached to the base frame, and an intermediate rail slidably attached to the base rail. In some implementations, the plurality of deck frame segments are slidably attached to the intermediate rail. In some configurations the plurality of deck frame segments includes a first deck frame segment slidably attached to the intermediate rail, a second deck frame segment attached to the first deck frame segment and configured to slide along the intermediate rail and articulate relative to the first deck frame segment, and a third deck frame segment attached to the second deck frame segment and configured to slide along the intermediate rail and articulate relative to the second deck frame segment.

In some examples, the second deck frame segment is pivotally attached to the first deck frame segment at a first deck frame joint and the third deck frame segment is pivotally attached to the second deck frame segment at a second deck frame joint. In some examples, the deck system includes an actuator system operable to translate the deck system along the frame system. In some configurations, the intermediate rail includes a retainer operable between a first position to restrict movement of the deck frame relative to the intermediate rail and a second position to permit movement of the deck frame relative to the intermediate rail. In some implementations, the retainer is operable to permit movement of the intermediate rail relative to the base rail in the first position and to restrict movement of the intermediate rail relative to the base rail in the second position.

In some examples, the deck system includes a control system operable to instruct the cargo lift system to move between a deployed configuration and a stowed configuration. In some configurations, the control system includes a key fob including a dual-purpose button operable to send first instructions for operating the vehicle when engaged for a first period of a time and to send instructions for operating the cargo lift system when engaged for a second period of time that is longer than the first period of time.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
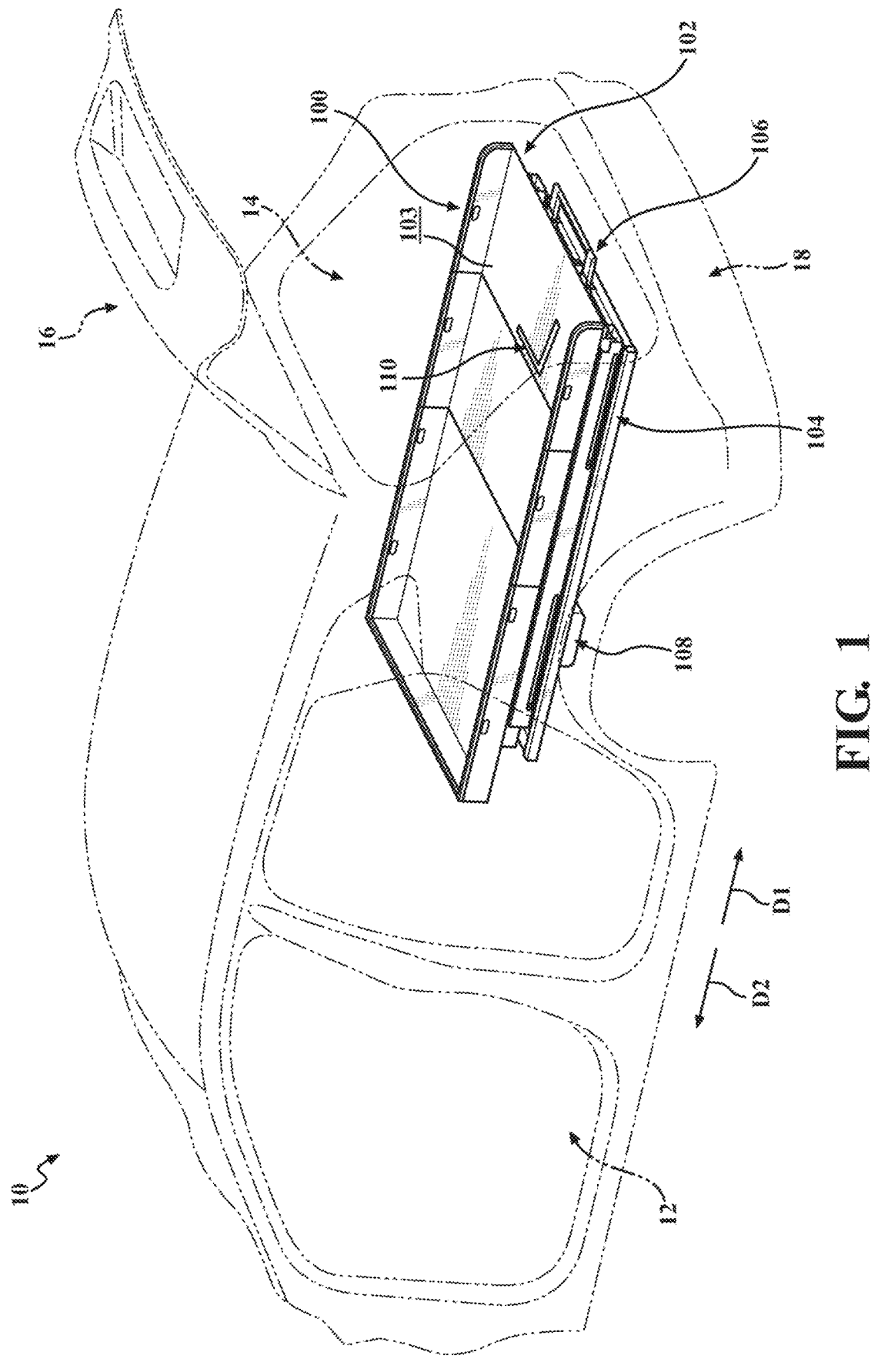
FIG. 1 is a perspective view showing a vehicle including an example of a cargo lift system according to the present disclosure, wherein the cargo lift system is in a stowed configuration.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising." "including," and "having." are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second." "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory. Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Figure 2:
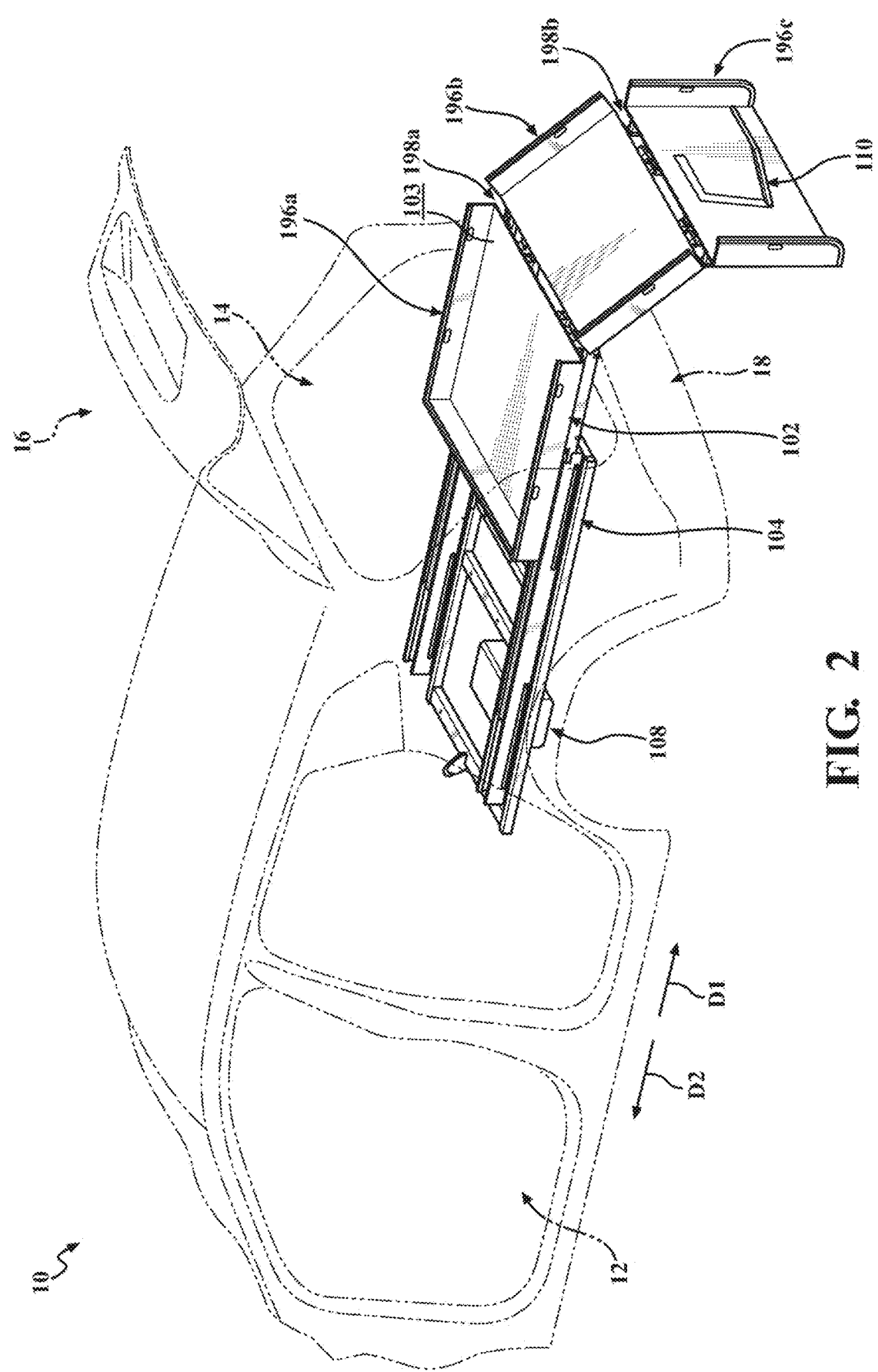
FIG. 2 is a perspective view showing a vehicle including an example of a cargo lift system according to the present disclosure, wherein the cargo lift system is in a deployed configuration.
Figure 3:
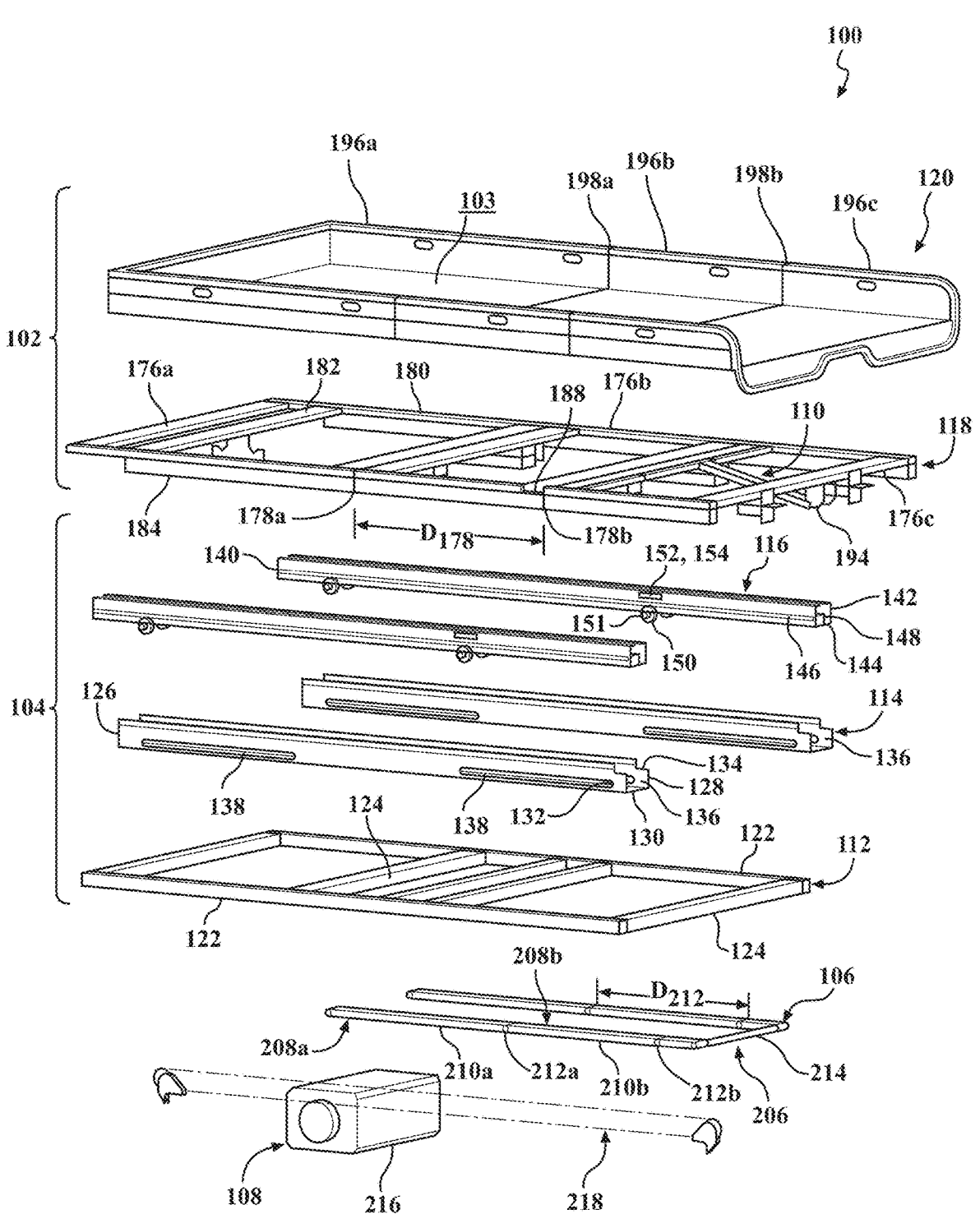
FIG. 3 is an exploded view of the cargo lift system of FIGS. 1 and 2.

Referring to FIGS. 1-3, a cargo lift system 100 for a motor vehicle 10 according to an example of the present disclosure is provided. The cargo lift system 100 of the present disclosure is shown in connection with a motor vehicle 10 including a vehicle body defining a passenger compartment 12 at a forward portion of the vehicle 10 and a rear cargo area 14 at a rear portion of the vehicle 10. As shown, the cargo area 14 may be accessible through a rear hatch 16. The motor vehicle 10 may further include a rear bumper 18 positioned adjacent to the rear cargo area 14 and below the rear hatch 16.

The cargo lift system 100 is disposed within the cargo area 14 of the vehicle 10 and is operable between a stowed configuration (FIG. 1) and a deployed configuration (FIG. 2). Generally, and as discussed in greater detail below; the cargo lift system 100 may be operated in different states of deployment. For example, in FIG. 2, the cargo lift system 100 is deployed in an articulated deployment mode, whereby the cargo lift system 100 extends from the rear hatch 16 and folds over the rear bumper 18 to a lift position adjacent to a ground surface associated with the vehicle 10. Alternatively, the cargo lift system 100 may be deployed in a rigid or unarticulated deployment mode, whereby the cargo lift system 100 simply extends from the rear hatch 16 of the cargo area 14 without articulating or folding (FIG. 6D). In the rigid deployment mode, the deck system 102 defines a rigid support platform that can be extended from and retracted into the cargo area 14. In the articulating deployment mode, the deck system 102 includes a plurality of segments that articulate in a vertical direction relative to the frame system 104 and the cargo area 14 to lift cargo from the ground surface into the cargo area 14.

The cargo lift system 100 includes a deck system 102 operable to move between the stowed configuration (FIG. 1) and the deployed configuration (FIGS. 2 and 6D). The cargo lift system 100 further includes a frame system 104 that supports the deck system 102 on a floor panel of the vehicle 10 within the cargo area 14. More particularly, the frame system 104 includes one or more components operable to slidably support the deck system 102 for movement between the stowed configuration and the deployed configuration. In the illustrated example, the cargo lift system is configured as a telescoping cargo lift system 100, whereby components of the frame system 104 and the deck system 102 slide independently of each other to facilitate extension of the deck system 102 from the cargo area 14.

Referring to FIG. 1, the cargo lift system 100 further includes a locking bar 106 attached to the deck system 102. Generally, the locking bar 106 is operable to be moved between a locked state and an unlocked state (FIG. 1) to selectively transition the deck system 102 between the articulating mode and the rigid mode. For example, the locking bar 106 may be moved to a first position (e.g., retracted within the cargo lift system 100) to select the rigid deployment mode. Alternatively, as shown in FIG. 1, the locking bar 106 may be moved to a second position (e.g., pulled from the cargo lift system 100) to select the articulating deployment mode. Operation of the cargo lift system 100 in the rigid deployment mode and the articulating deployment mode is more fully described below with respect to FIGS. 6A-6D and FIGS. 7A-7I, respectively.

Referring still to FIG. 1, the cargo lift system 100 includes an actuator system 108 configured for moving the deck system 102 between the stowed configuration and the deployed configuration. The actuator system 108 may be powered and communicates with a vehicle control system 300 to receive and execute instructions for moving between the stowed configuration and the deployed configuration. Generally, the actuator system 108 is configured to facilitate linear or translational movement of the deck system 102 relative to the frame system 104. In other words, the actuator system 108 operates in an extend mode to move the deck system 102 in a first direction D1 to the deployed configuration, and operates in a retract mode to move the deck system in an opposite second direction D2 to the stowed configuration. The actuator system 108 may further include one or more powered latches or locks for securing the deck system 102 in the stowed or deployed configurations.

Referring to FIGS. 1 and 2, the cargo lift system 100 includes a cargo hook 110 pivotally attached to the deck system 102. Generally, the cargo hook 110 is operable to move between a retracted state (FIG. 1) to an extended state (FIG. 2). In the retracted state, the cargo hook 110 is positioned within or adjacent to the deck system 102. For example, the cargo hook 110 may be folded against or received flush with an upper support surface 103 of the deck system 102 in the retracted state. Alternatively, the cargo hook 110 may be moved to the extended state, whereby the cargo hook 110 is pivoted away from the upper support surface 103 of the deck system 102. In the extended state, the cargo hook 110 is spaced apart from the upper support surface 103 and is configured to engage a unit of cargo. In a particular example, the cargo hook 110 is configured to engage a wheelchair positioned on the ground surface adjacent to the rear bumper 18. The cargo hook 110 then functions to lift the cargo or wheelchair into the cargo area 14 when the deck system 102 is returned to the stowed configuration.

Referring now to FIG. 3, the frame system 104 includes a base frame 112 that attaches to the floor panel of the cargo area 14, one or more base rails 114 fixed to the base frame 112, and one or more intermediate rails 116 each configured to slidably interface with a respective one of the base rails 114. Generally, each of the base frame 112 and the base rails 114 are configured to be fixed in a stationary state to the floor panel, while the intermediate rails 116 are slidably attached to the base rails 114 in a manner that allows the intermediate rails 116 to translate in the first direction D1 and the second direction D2 along the base rails 114. The deck system 102 includes a deck frame 118 and a platform 120 that are attached to the frame system 104 via the intermediate rail 116. As discussed in greater detail below, the deck frame 118 is operable to translate in the first direction D1 and the second direction D2 relative to the intermediate rail 116, while the platform 120 is attached to the deck frame 118 and moves with the deck frame 118 in the first direction D1 and the second direction D2.

The base frame 112 includes a frame structure having a plurality of base frame side members 122 extending along a longitudinal direction of the cargo area 14 (i.e., along the first and second directions D1, D2). In the illustrated example, the base frame side members 122 include a pair of base frame side members 122 extending along opposite sides of the base frame 112 and defining an overall length of the base frame 112. The base frame 112 further includes a plurality of base frame cross members 124 connecting the base frame side members 122 and defining an overall width of the base frame 112. Generally, the base frame 112 is configured to provide a mounting interface between the floorboard of the vehicle 10 and the cargo lift system 100. Accordingly, it will be appreciated that the arrangement and quantity of the base frame side members 122 and the base frame cross members 124 may be modified to accommodate mounting structures of different vehicle bodies.

Referring still to FIG. 3, the frame system 104 includes the one or more base rails 114 attached to the base frame 112. In the illustrated example, the frame system 104 includes a pair of the base rails 114 that each attach to a respective one of the base frame side members 122. The base rails 114 are attached in a stationary manner relative to the base frame 112, whereby, when the frame system 104 is assembled, the base rails 114 do not move relative to the base frame 112 during normal operation (i.e., transition between the stowed configuration and the deployed configuration).

Each of the base rails 114 extends along the longitudinal direction of the vehicle 10) from a first end 126 to an opposite second end 128. A distance from the first end 126 to the second end 128 defines a length of the base rail 114, which may be selected based on the size of the vehicle cargo area 14. Each base rail 114 includes a base rail bottom wall 130 extending from the first end 126 to the second end 128. The base rail 114 further includes a pair of base rail sidewalls 132 extending from opposite sides of the base rail bottom wall 130. Each base rail sidewall 132 includes a base rail notch 134 formed at an upper or distal edge of the base rail sidewall 132 adjacent to the second end 128 of the base rail 114. As discussed below, the base rail notch 134 is configured to interface with a retainer 154 of the intermediate rail 116 to facilitate progressive deployment and retraction of the components of the cargo lift system 100.

The base rail bottom wall 130 and the base rail sidewalls 132 cooperate to define a base rail channel 136 extending along the length of the base rail 114 between the first end 126 and the second end 128. In the illustrated example, the base rail channel 136 extends continuously from the first end 126 to the second end 128, whereby the ends 126, 128 of the base rail 114 are open. As discussed below; the base rail channel 136 of each base rail 114 is configured to slidably receive a respective one of the intermediate rails 116. Optionally, each of the base rail sidewalls 132 includes one or more guides 138 configured to interface with and retain the intermediate rail 116 within the base rail 114. For example, the base rail sidewalls 132 may include one or more elongate guide slots 138 formed at least partially through a thickness of the base rail sidewall 132 and extending along a lengthwise direction, parallel to the base rail bottom wall 130, from the first end 126 to the second end 128. Additionally or alternatively, the base rail sidewalls 132 may include flanges or lips formed along the upper distal ends thereof, which function to capture or retain the intermediate rail within the base rail channel 136.

With continued reference to FIG. 3, the frame system 104 includes the one or more intermediate rails 116 operable to translate along the respective base rails 114. Generally, the intermediate rails 116 and the base rails 114 have a telescoping relationship, whereby the intermediate rails 116 are received within and selectively extend from the base rails 114. In the illustrated example, the intermediate rails 116 are configured to be slidably received within the base rail channels 136, whereby the intermediate rails 116 move between the stowed configuration within the base rail channel 136 and the deployed configuration extending from the second end 128 of the base rail channel 136.

Each of the intermediate rails 116 extends along the longitudinal direction D1, D2 of the vehicle 10 from a first end 140 to an opposite second end 142. A distance from the first end 140 to the second end 142 defines a length of the intermediate rail 116, which may be selected based on the size of the vehicle cargo area 14. Each intermediate rail 116 includes an intermediate rail bottom wall 144 extending from the first end 140 to the second end 142. The intermediate rail 116 further includes a pair of intermediate rail sidewalls 146 extending from opposite sides of the intermediate rail bottom wall 144. Each intermediate rail sidewall 146 includes an intermediate rail notch 152 formed at an upper or distal edge of the intermediate rail sidewall 146 between the first end 140 and the second end 142 of the intermediate rail sidewall 146. Each intermediate rail sidewall 146 further includes a retainer 154 attached to the intermediate rail sidewall 146 adjacent to the intermediate rail notch 152. As discussed below; the retainer 154 of the intermediate rail 116 is configured to interface with the intermediate rail notch 152 and the base rail notch 134 to facilitate progressive deployment and retraction of the components of the cargo lift system 100.

The intermediate rail bottom wall 144 and the intermediate rail sidewalls 146 cooperate to define an intermediate rail channel 148 extending along the length of the intermediate rail 116 between the first end 140) and the second end 142. In the illustrated example, the intermediate rail channel 148 extends continuously from the first end 140 to the second end 142, whereby the ends 140, 142 of the intermediate rail 116 are open. As discussed below; the intermediate rail channel 148 of each intermediate rail 116 is configured to be slidably received within a respective one of the base rails 114. Optionally, each of the intermediate rail sidewalls 146 includes one or more bearings 150 configured to interface with and retain the intermediate rail 116 within the base rail 114. For example, the intermediate rail sidewalls 146 may include one or more rollers 150 extending from the intermediate rail sidewall 146. The rollers 150 are operable to provide a rolling interface between the intermediate rail 116 and the base rail bottom wall 130. Optionally, each roller 150 may include a roller shaft 151 configured to be slidably received within one of the base rail guides 138 when the intermediate rail 116 is received within the base rail channel 136. The sliding interface between the roller shaft 151 and the base rail guide 138 provides two functions. First, the sliding interface functions to constrain vertical movement of the intermediate rail 116 within the base rail channel 136, thereby retaining the intermediate rail 116 within the base rail 114. Second, the base rail guides 138 function as a travel limit in the longitudinal direction (i.e., from first end 126 to second end 128) to constrain longitudinal movement of the intermediate rail 116 relative to the base rail 114. Thus, the base rail guides 138 prevent over-extension of the intermediate rail 116 from the base rail channel 136 during transition of the cargo lift system to the deployed configuration. In other words, the base rail guides 138 define the distance that the intermediate rail 116 can travel or slide relative to the base rail in the first direction D1 and the second direction D2.

Figures 4, 5A, 5B:
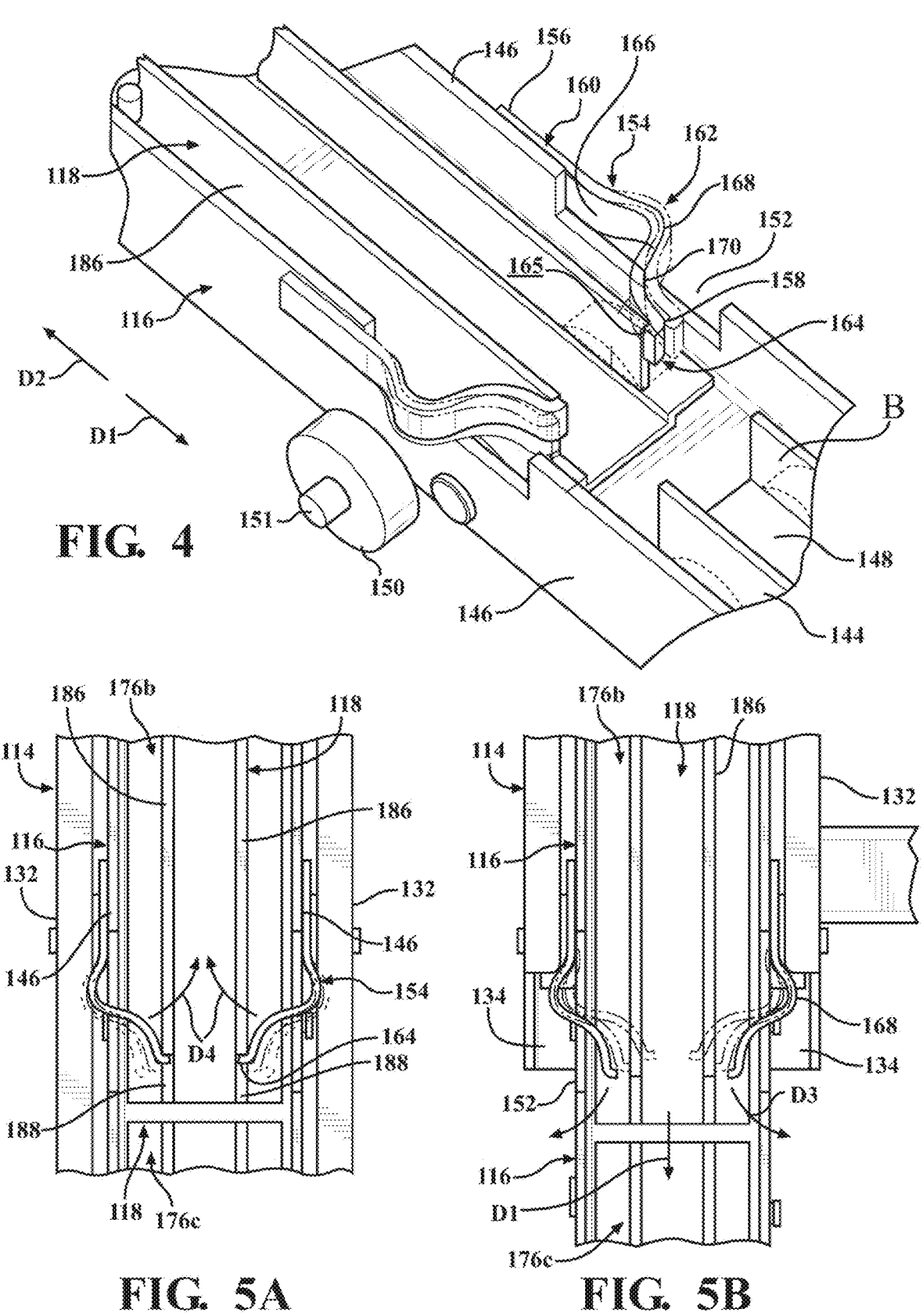
FIG. 4 is an enlarged partial perspective view of an intermediate rail and deck frame of the cargo lift system of FIG. 3.
FIG. 5A is top plan view of the intermediate rail and the deck frame of FIG. 4, wherein the deck frame is retracted within the intermediate rail and retainers of the deck frame are in a locked state to prevent movement of the deck frame relative to the intermediate rail.
FIG. 5B is top plan view of the intermediate rail and the deck frame of FIG. 4, wherein the deck frame is extended from the intermediate rail and retainers of the deck frame are in an unlocked state to permit movement of the deck frame relative to the intermediate rail.

With reference to FIGS. 4-6, an example of the intermediate rail notches 152 and the retainers 154 of the intermediate rail 116 is provided. Generally, the retainers 154 are operable to move between a locked state (shown in phantom line in FIG. 4) and an unlocked state (shown in solid line in FIG. 4). In the locked state, each retainer 154 engages a portion of the deck system 102 to prevent relative translational movement between the intermediate rail 116 and the deck system 102. Conversely, in the unlocked state, each retainer 154 disengages the deck system 102 to permit relative translational movement between the intermediate rail 116 and the deck system 10. Thus, the retainer 154 functions to provide progressive deployment of the cargo lift system 100, whereby the deck system 102 cannot move relative to the intermediate rail 116 until the retainers 154 move from the locked state (FIG. 5A) to the unlocked state (FIG. 5B) when the intermediate rail 116 is fully deployed from the base rail 114.

As detailed in FIG. 4, each retainer 154 includes a first end 156 attached to the intermediate rail 116 and a distal second end 158 that is free-hanging and operable to move relative to the first end 156 to transition the retainer 154 between the locked state and the unlocked state. In the illustrated example, the retainer 154 is formed as a spring element having the first end 156 attached to the intermediate rail sidewall 146 adjacent to the intermediate rail notch 152 and the second end 158 extending into the intermediate rail channel 148 from the intermediate rail sidewall 146. The retainer 154 may be described as including a flat portion 160 attached to the intermediate rail sidewall 146 at the first end 156, a spring portion 162 extending between the flat portion 160 and the second end 158, and a catch 164 disposed at a distal end of the spring portion 162 at the second end 158.

Generally, the spring portion 162 if configured to provide resilience to the retainer 154 to facilitate movement between the locked state and the unlocked state. The catch 164 is configured to engage a portion of the deck system 102 when the retainer 154 is in the locked state to prevent movement of the deck system 102 relative to the intermediate rail 116. In the illustrated example, the spring portion 162 includes a flat spring having a plurality of arcuate spring segments 166, 168, 170 configured to facilitate flexibility and retention functions of the retainer 154. Particularly, the spring portion 162 includes a first arcuate spring segment 166 extending from the flat portion 160. The first arcuate spring segment 166 curves outwardly relative to a centerline of the intermediate rail 116. In other words, the first arcuate spring segment 166 defines a concave curvature facing outwardly from the centerline of the intermediate rail 116.

The second arcuate spring segment 168 extends from the first arcuate spring segment 166 and curves in an opposite direction from the first arcuate spring segment 166. As shown in FIGS. 4-5B, the second arcuate spring segment 168 forms a convex bump or protrusion that extends outwardly from the intermediate rail sidewall 146 by a first distance when the retainer 154 is in the natural, unbiased state (FIG. 4 phantom line). As discussed below and shown in FIG. 5B, the bumps defined by the second arcuate spring segments 168 of the retainers 154 are configured to extend into the base wall notches 134 of the respective base wall sidewalls 146 when the cargo lift system 100 is moved to the deployed configuration (FIG. 5B), whereby the second arcuate spring segments 168 contact the ends of the base rail sidewalls 132 to restrict movement of the intermediate rail in the second direction D2 relative to the base rail 114. In other words, a width defined across the second arcuate spring segments 168 is greater than a width across the base rail sidewalls 132 when the retainers 154 are in the natural, unbiased state.

The third arcuate spring segment 170 extends from the second arcuate spring segment 168 and curves in an opposite direction from the second arcuate spring segment 168. Thus, the third arcuate spring segment 170 defines a concave surface facing outwardly from the centerline of the intermediate rail 116.

The catch 164 is disposed at the distal end of the spring portion 162 and is configured to engage the deck system 102 when the retainer 154 is in the locked state (FIGS. 4, 5A). In the illustrated example, the catch 164 is formed as a finger or tab 164 extending inwardly towards the centerline of the intermediate rail 116. The tab 164 defines an inner surface 165 that abuts an opposing end surface of the deck system 102 when the retainer is in the locked state, whereby the inner surface 165 prevents the deck system 102 from moving in the first direction D1 relative to the intermediate rail 116.

Referring again to FIG. 3, the deck system 102 includes the deck frame 118 slidably coupled to the intermediate rail 116 and the platform 120 attached to the deck frame 118. Thus, the platform 120 is configured to translate with the deck frame 118 relative to the intermediate rail 116. Generally, the deck system 102 is configured to transition from a flat state to an articulated state by articulating along a series of joints when the cargo lift system 100 is moved to the deployed configuration in the articulating operating mode, as shown in FIG. 2.

The deck frame 118 includes a series of deck frame segments 176a-176c pivotally attached to each other at respective joints 178a-178b formed between intermediate ones of the deck frame segments 176a-176c. Particularly, the deck frame 118 includes a first deck frame segment 176a and a second deck frame segment 176b pivotally coupled to each other at a first deck frame joint 178a formed between the first deck frame segment 176a and the second deck frame segment 176b. The deck frame 118 of the present example further includes a third deck frame segment 176c pivotally coupled to the second deck frame segment 176b by a second deck frame joint 178b. The deck frame joints 178a, 178b may be formed as hinge elements each attached to adjacent ones of the deck frame segments 176a-176c. When the deck system 102 is moved to the deployed configuration in the articulating operating mode, the first deck frame segment 176a remains slidably coupled to the intermediate rail 116 while the second deck frame segment 176b and the third deck frame segment 176c extend from the intermediate rail 116 and articulate or pivot towards the ground surface relative to the first deck frame segment 176a. Thus, the second deck frame segment 176b and the third deck frame segment 176c may be referred to as articulating deck frame segments 176b, 176c. While the illustrated deck frame 118 includes three deck frame segments 176a-176c and two corresponding deck frame joints 178a-178b, other configurations may include any number of deck frame segments and corresponding deck frame joints.

The deck frame segments 176a-176c are each constructed of a pair of deck frame side rails 180 extending along a lengthwise direction (i.e., parallel to the first direction D1) and corresponding deck frame cross members 182 extending between and connecting the deck frame side rails 180. The deck frame side rails 180 may include one or more deck frame bearing elements 184 configured to provide a sliding interface between the deck frame side rails 180 and the intermediate rails 116. In the illustrated example, the deck frame bearing elements 184 include sliding bearing elements configured to slide along the intermediate rail bottom wall 144 when the deck frame side rails 180 are received within the intermediate rail channel 148. However, in other examples, the deck frame bearing elements 184 may include dynamic bearing elements, such as rollers or ball bearing components.

As best shown in FIGS. 4-5B, the deck frame side rails 180 include one or more deck frame walls 186 that extend along a length of the deck frame side rail 180. The deck frame walls 186 may include outer walls and/or interior ribs (i.e., spaced inwardly from the outer walls). The deck frame walls 186 of the deck frame side rails 180 may include one or more deck frame notches 188 formed therein. Generally, the deck frame notches 188 are configured to receive the second ends 158 of the respective retainers 154 to allow the catch 164 of the retainer 154 to engage an end portion of one of the deck frame walls 186 when the retainer is in the locked state. In the illustrated example, the deck frame notches 188 are formed in the deck frame walls 186 of the second deck frame segment 176b adjacent to the second deck frame joint 178b. In other words, the deck frame notches 188 are positioned to align with and receive the retainers 154 when the cargo lift system 100 is in the stowed state (FIG. 5A).

The platform 120 includes a plurality of platform panels or segments 196a-196c respectively attached to the deck frame segments 176a-176c. Adjacent ones of the platform panels 196a-196c are separated from each other by respective platform joints 198a. 198b, whereby the platform panels 196a-196c are not directly coupled to each other and are operable to articulate relative to the other ones of the deck panels 196a-196c via the deck frame joints 178a-178b. The platform panels 196a-196c cooperate to define the upper support surface 103 of the deck system 102 when the deck system 102 is in the stowed configuration or in the rigid deployed configuration.

With continued reference to FIG. 3, the locking bar 106 attaches along an underside of the deck frame 118 and is operable to move between a locked position to prevent articulation of the deck system 102 and an unlocked position to permit articulation of the deck system 102. The locking bar 106 includes a locking bar frame 206 including a pair of locking bar frame segments 208a, 208b. Each locking bar frame segment 208a, 208b includes a pair of locking bar side members 210a, 210b attached in series with locking bar side members 210a. 210b of an adjacent locking bar frame segment 208a, 208b. The locking bar frame segments 208a. 208b are pivotally coupled to each other at a locking bar joint 212a, whereby adjacent ones of the locking bar frame segments 208a. 208b can articulate relative to each other along the respective locking bar joint 212a. The locking bar frame 206 further includes a locking bar handle 214 pivotally coupled to an end of one of the locking bar frame segments 208b along a second one of the locking bar joints 212b. Thus, the locking bar frame 206 includes a first locking bar frame segment 208a, a second locking bar frame segment 208b, and the locking bar handle 214 arranged in series and respectively coupled to each other by the locking bar joints 212a, 212b.

The locking bar joints 212a. 212b are spaced apart from each other by distances D212 that correspond to distances D178 between the deck frame joints 178a, 178b. In use, the corresponding spacing of the locking bar joints 212a, 212b and the deck frame joints 178a. 178b allows the locking bar 106 to operate between a locked position and an unlocked position. In the locked position (FIG. 6A), the locking bar 106 is retracted or pushed in the second direction D2 relative to the deck frame 118 and the locking bar joints 212a. 212b are offset or misaligned relative to the deck frame joints 178a, 178b in second direction D2. In other words, the locking bar joints 212a, 212b are not vertically aligned when the locking bar 106 is in the locked position. Thus, in the locked position, the deck frame joints 178a, 178b are positioned vertically above the rigid locking bar side members 210a, 240b such that the locking bar side members 210a, 210b function as braces to prevent relative articulation between adjacent ones of the deck frame segments 176a-176c at the deck frame joints 178a-178b. Conversely, in the unlocked position (FIG. 7B), the locking bar 106 is extended or pulled in the first direction D1 relative to the deck frame 118 and the locking bar joints 212a, 212b are vertically aligned with the deck frame joints 178a. 178b. Thus, in the unlocked position, the deck frame joints 178a, 178b are positioned vertically above the locking bar joints 212a, 212b such that the deck frame segments 176a-176c can articulate with the locking bar joints 212a, 212b.

Referring to FIGS. 1-3, the cargo hook 110 is pivotally attached to the third platform panel 196c. The cargo hook 110 includes a cargo hook lower arm 190 pivotally attached to the deck system 102 at a cargo hook pivot 194. The cargo hook 110 further includes a cargo hook upper arm 192 attached to a distal end of the cargo hook lower arm 190 from the cargo hook pivot 194. In use, the cargo hook 110 is operable to pivot from a retracted state (FIG. 1) to an extended state (FIG. 2) when the cargo lift system 100 is in the deployed configuration. While the cargo hook 110 may be powered (e.g., a motor), the illustrated cargo hook 110 operates under the effects of gravity. Thus, when the cargo lift system 100 moves to the articulated deployed configuration, the weight of the cargo hook 110 causes the cargo hook 110 to automatically pivot on the cargo hook pivot 194 to the extended state.

The actuator system 108 is generally configured to move the cargo lift system 100 between the deployed configuration and the stowed configuration. In the illustrated example, the actuator system 108 includes an actuator motor 216 and an actuator drive 218 coupling the actuator motor 216 to the deck system 102. While the illustrated actuator drive 218 includes a pulley system operable to pull the deck system 102 in the first direction D1 and the second direction D2, other types of linear actuator systems may be utilized. For example, screw drives or gear systems may be used in place of or in combination with the pulley system.

Figure 6A:
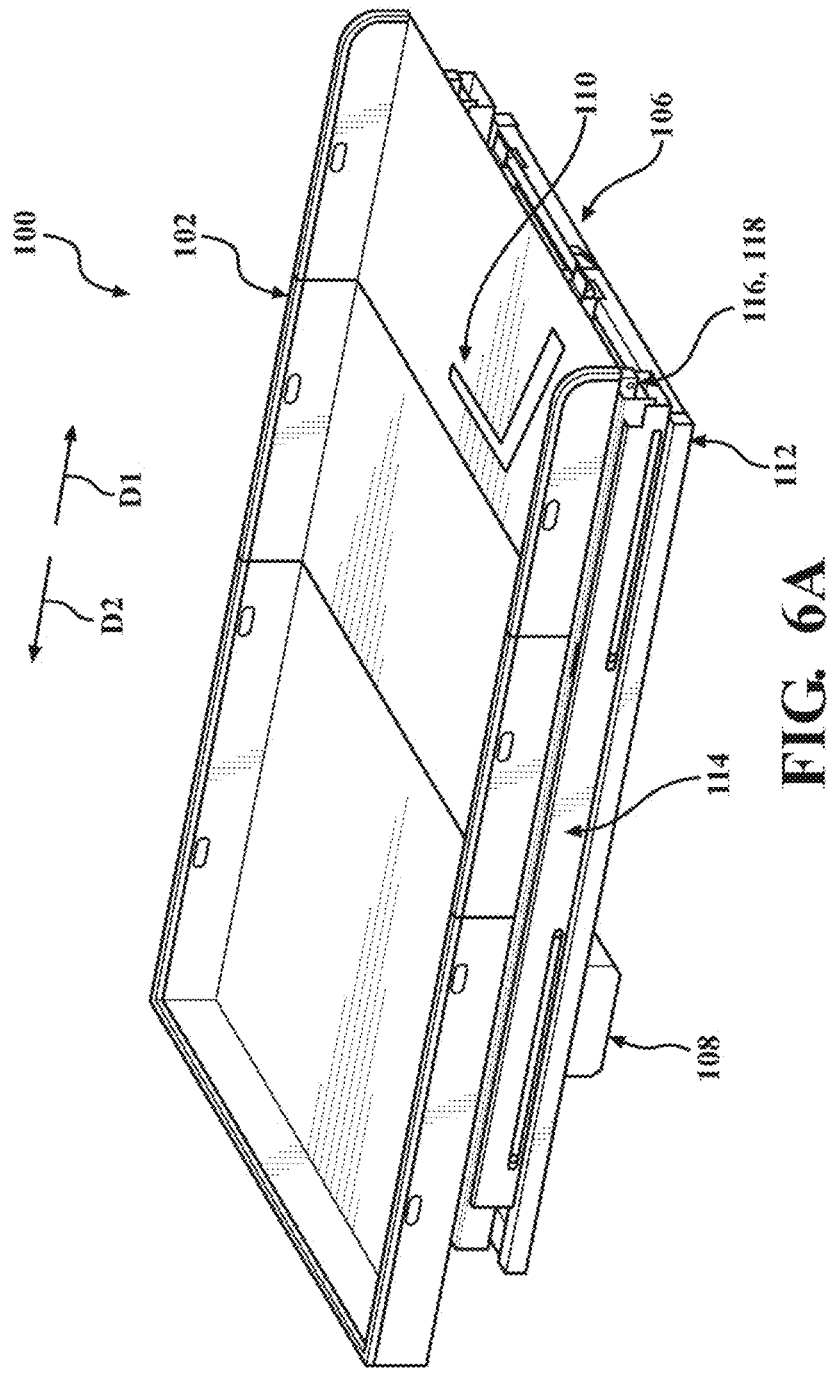
FIGS. 6A-6D are perspective views of the cargo lift system of FIG. 1, showing the cargo lift system transitioning from a fully stowed state to a fully deployed state in a rigid deployment mode.
Figure 6B:
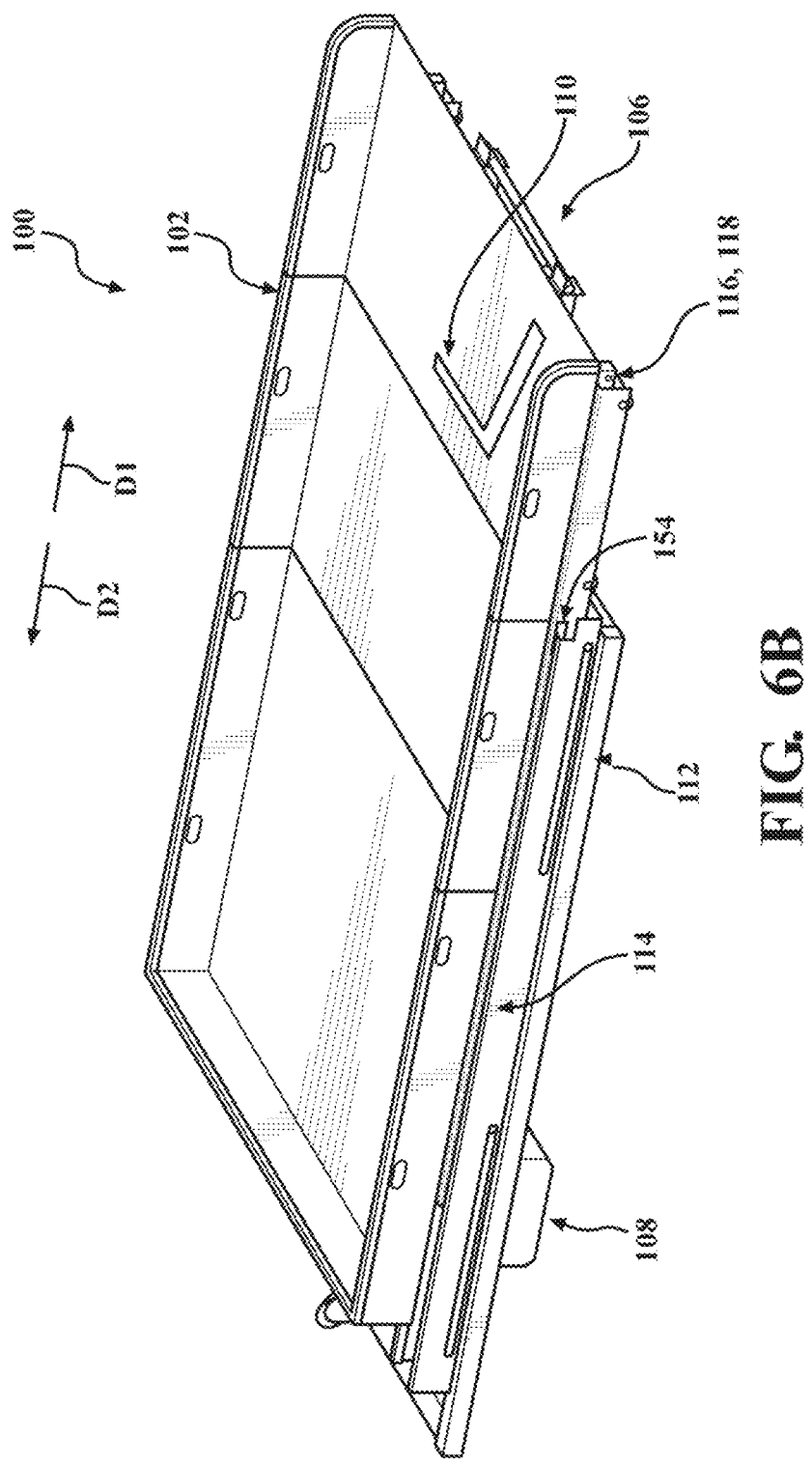
Figure 6C:
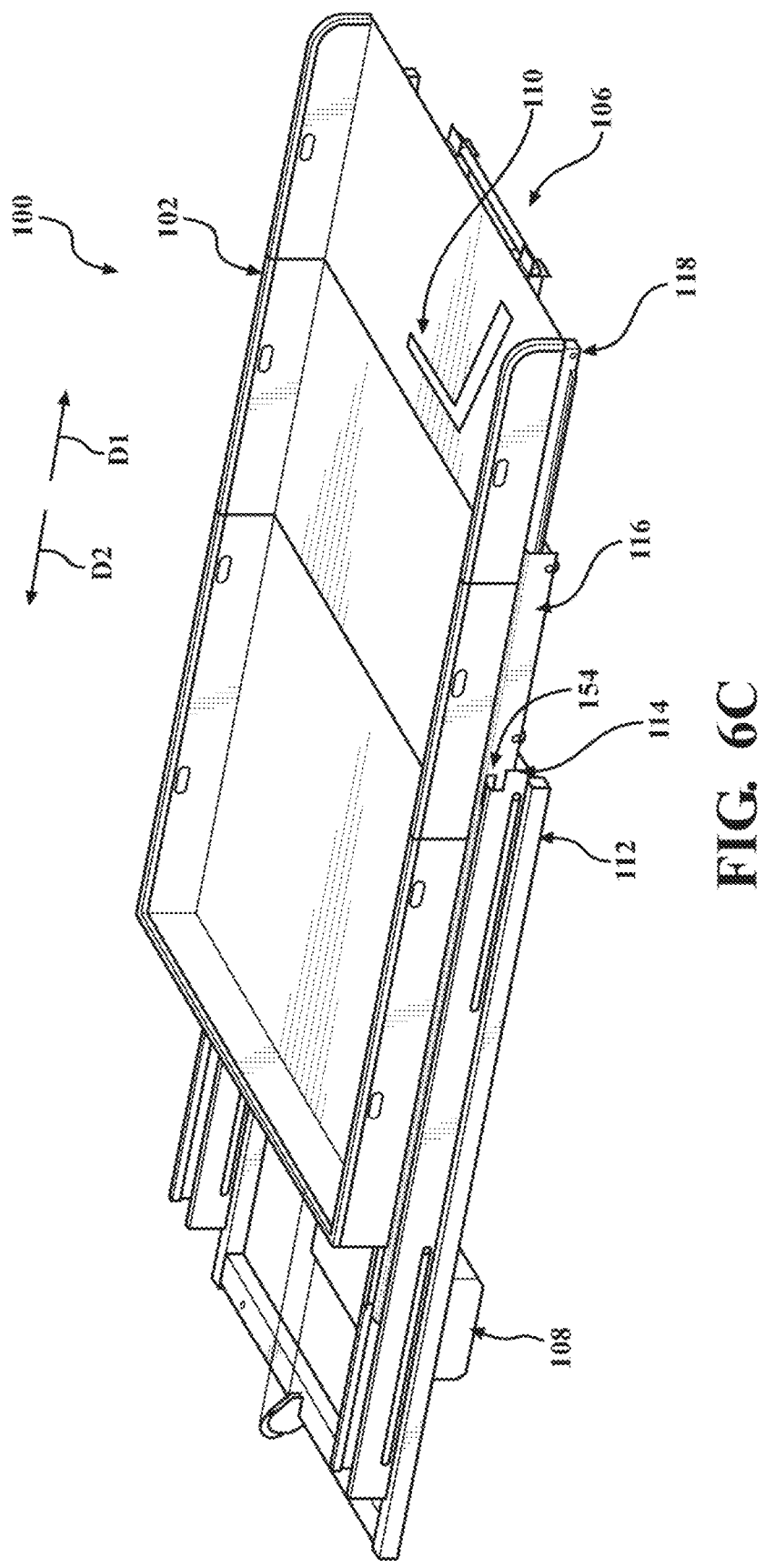
Figure 6D:
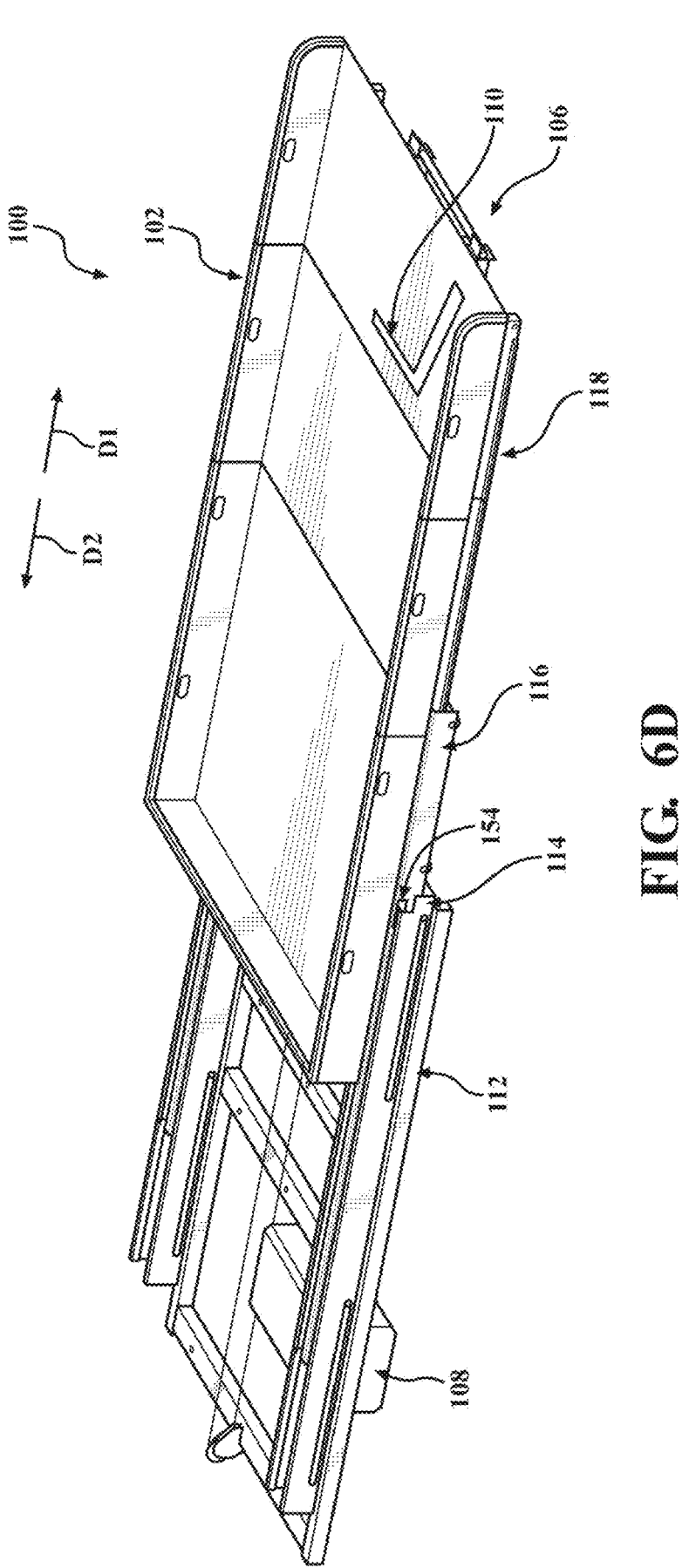

Referring to FIGS. 6A-6D, operation of the cargo lift system 100 is progressively illustrated from the stowed configuration to the deployed configuration when the cargo lift system 100 is in the rigid deployment mode (i.e., locking bar 106 retracted). FIG. 6A shows the cargo lift system 100 in the fully stowed configuration.

FIG. 6B shows a primary deployment step, whereby the cargo lift system 100 is biased in the first direction D1 by the actuator system 108. Here, the intermediate rails 116 initially translate in the first direction D1 relative to the base rails 114. However, as discussed previously, relative movement between the deck system 102 and the intermediate rails 116 is restricted by the retainers 154, whereby the deck system 102 moves with the intermediate rails 116 in the first direction D1 during the primary deployment step. With reference to FIG. 5A, when the intermediate rails 116 are fully retracted within the base rails 114, the base rail sidewalls 132 bias against the bumps of the retainers 154 formed by the second arcuate spring segments 168 to move the second ends 158 of the retainer 154 inwardly towards the centerline of the respective intermediate rails 116. When biased inwardly, the catches 164 formed at the second ends 158 of the retainers 154 engage or "catch" ends of the deck frame walls 186. Thus, the catches 164 prevent the deck frame walls 186 from moving past the retainers in the first direction D1 when the retainers 154 are biased inwardly by the base rail sidewalls 132, thereby causing the deck system 102 to move synchronously with the intermediate rails 116 through the primary deployment step of FIG. 6B.

In the initial deployment position of FIG. 6B, the first and second deck frame segments 176a, 176b and the first and second platform panels 196a, 196b are supported within the cargo area 14 by the base rails 114 while the second ends of the intermediate rails 116 and the third deck frame segment 176c are cantilevered from the second ends 128 of the base rails 114. Particularly, the third deck frame segment 176c and the third platform panel 196c are supported above the bumper 18 by the length of the intermediate rails 116 between the second end 142 and the intermediate rail notch 188. In other words, the third deck frame segment 176c and the third platform panel 196c are also cantilevered from the second ends 128 of the base rails 114. Thus, by restricting movement of the deck system 102 relative to the intermediate rails 116 until the intermediate rails 116 move to the initial deployment position (FIG. 6B), the deck system 102 is supported above and cantilevered over the rear bumper 18 to avoid impact or interference with the rear bumper 18.

When the deck system 102 is moved to the initial deployment position shown in FIG. 6B, the retainers 154 of the intermediate rails 116 move in the first direction D1 within the base rail channel 136 and into alignment with the base rail notches 134 formed at the second ends 128 of the base rails 114. Thus, the base rail sidewalls 132 function to constrain the retainers 154 in the inwardly biased state through the initial deployment step until the retainers 154 are aligned with the base rail notches 134. When the retainers 154 are aligned with the base rail notches 134, the natural biasing force of the spring portion 162 causes the spring portion 162 and the catch 164 to move outwardly in the third direction D3 and into the base rail notches 134, as shown in FIG. 5B. When the catches 164 move outwardly, the catches 164 disengage the ends of the deck frame walls 186 of the deck frame 118, thereby allowing the deck frame 118 to pass between the catches 164 and to move in the first direction D1 relative to the intermediate rail 116.

As shown in FIG. 6C, when the retainers 154 move outwardly to the unlocked state, the deck system 102 is able to move through a secondary deployment step to a secondary deployment position where the intermediate rail 116 is extended relative to the base rail 114 and the deck system 102 is extended relative to the intermediate rail 116. In the secondary deployment position, the second deck frame joint 178b is aligned with the second ends 142 of the intermediate rails 116, whereby the first and second deck frame segments 176a, 176b and the first and second platform panels 196a. 196b are supported above the intermediate rail 116 and the bumper 18 while the third deck frame segment 176c and the third platform panel 196c are cantilevered from the intermediate rail 116 beyond the bumper 18.

In FIG. 6D, the deck system 102 is moved to a fully deployed state in the rigid deployment mode. In the fully deployed state, the first deck frame joint 178a is aligned with the second ends 142 of the intermediate rails 116, whereby the first deck frame segment 176a and the first platform panel 196a are supported above the intermediate rail 116 and the bumper while the second and third deck frame segments 176b, 176c and the second and third platform panels 196b, 196c are cantilevered from the intermediate rail 116 and extend beyond the bumper 18.

To return to the stowed state, the operations described above are reversed. Particularly, the deck system 102 is moved in the second direction D2 relative to the intermediate rail 116 to return the cargo lift system 100 to the initial deployment position (FIG. 6B). Once the deck system 102 is fully retracted relative to the intermediate rail 116, a force applied to the deck system 102 in the second direction D2 biases the intermediate rail 116 in the second direction D2, whereby the retainers 154 are forced in the second direction D2 towards the base rail sidewalls 132. When the cargo lift system is in the primary deployment position and the secondary deployment position, the first arcuate spring segments 166 of the retainers 154 abut respective ends of the base rail sidewalls 132 and the base rail sidewalls 132 bias the spring portion 162 of the retainers 154 (FIG. 5B). Here, the bumps associated with the second arcuate spring segments 168 are biased inwardly by the base rail sidewalls 132 to move the catches 164 inwardly in a fourth direction (D4), where the catches re-engage the ends of the deck frame walls 186 (FIG. 5A).

Figure 7A:
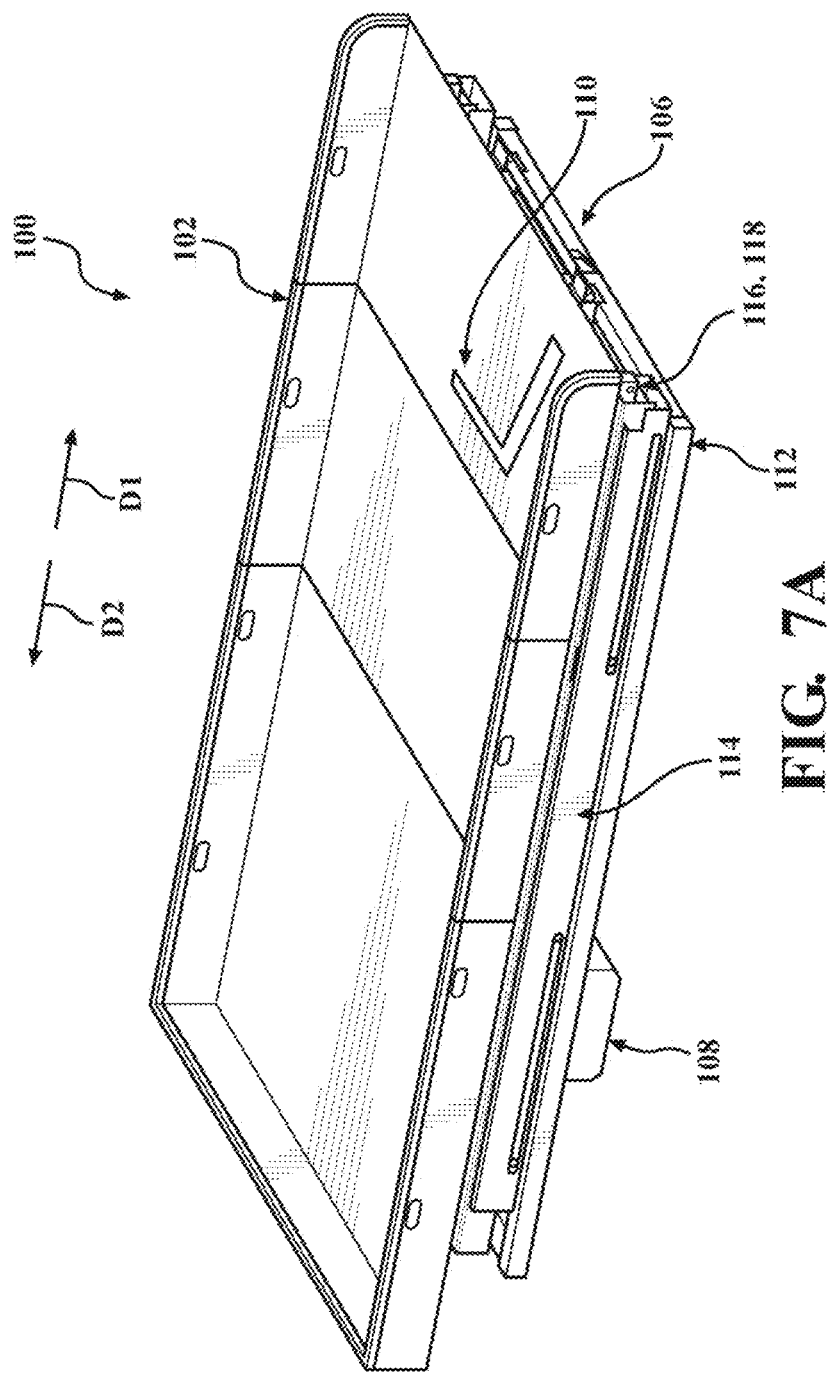
FIGS. 7A-7I are perspective views of the cargo lift system of FIG. 1, showing the cargo lift system transitioning from a fully stowed state to a fully deployed state in an articulating deployment mode.

Referring to FIGS. 7A-7H, operation of the cargo lift system 100 is progressively illustrated from the stowed configuration to the deployed configuration when the cargo lift system 100 is in the articulating deployment mode (i.e., locking bar 106 extended). FIG. 7A shows the cargo lift system 100 in the fully stowed configuration.

Figure 7B:
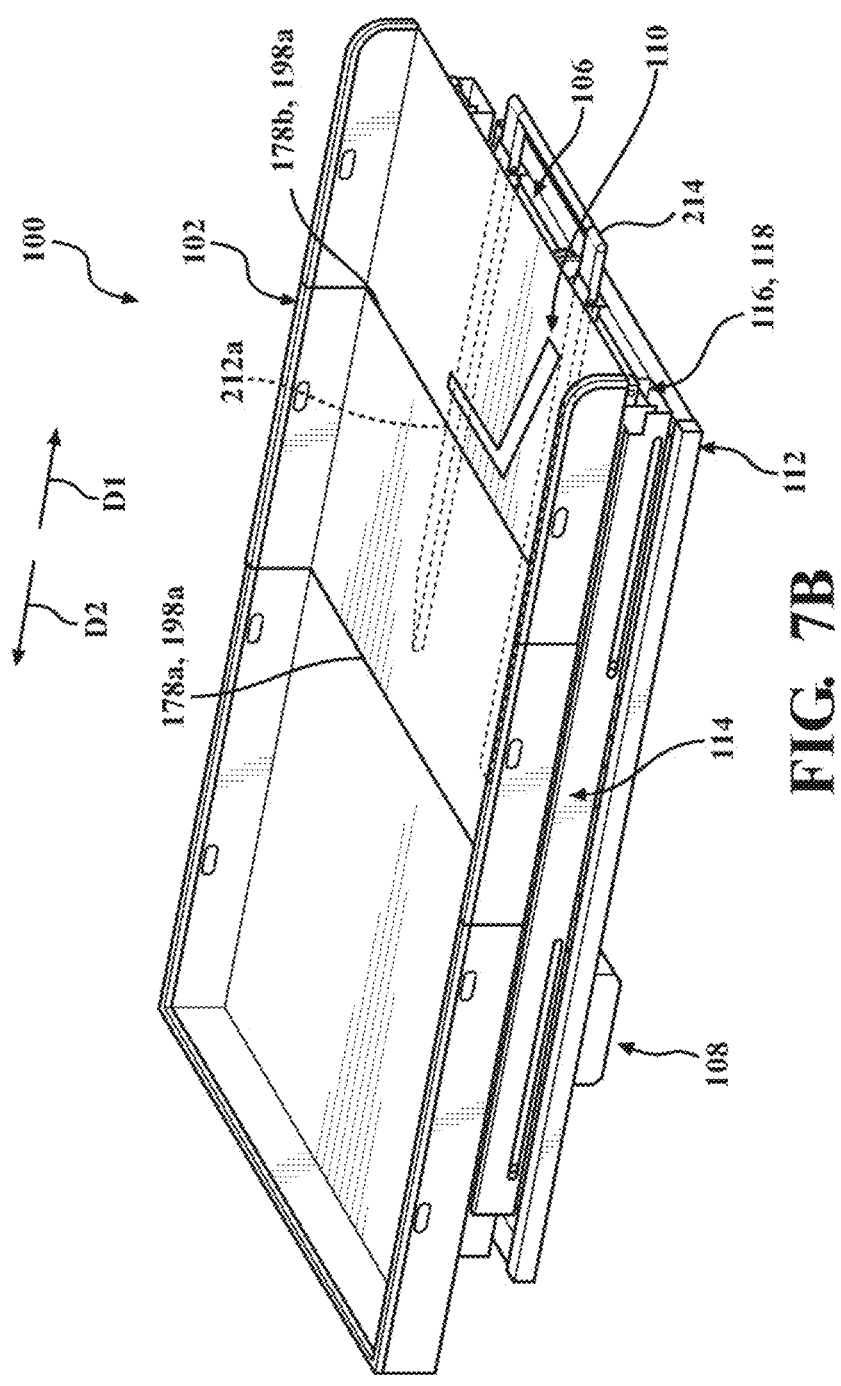
Figure 7C:
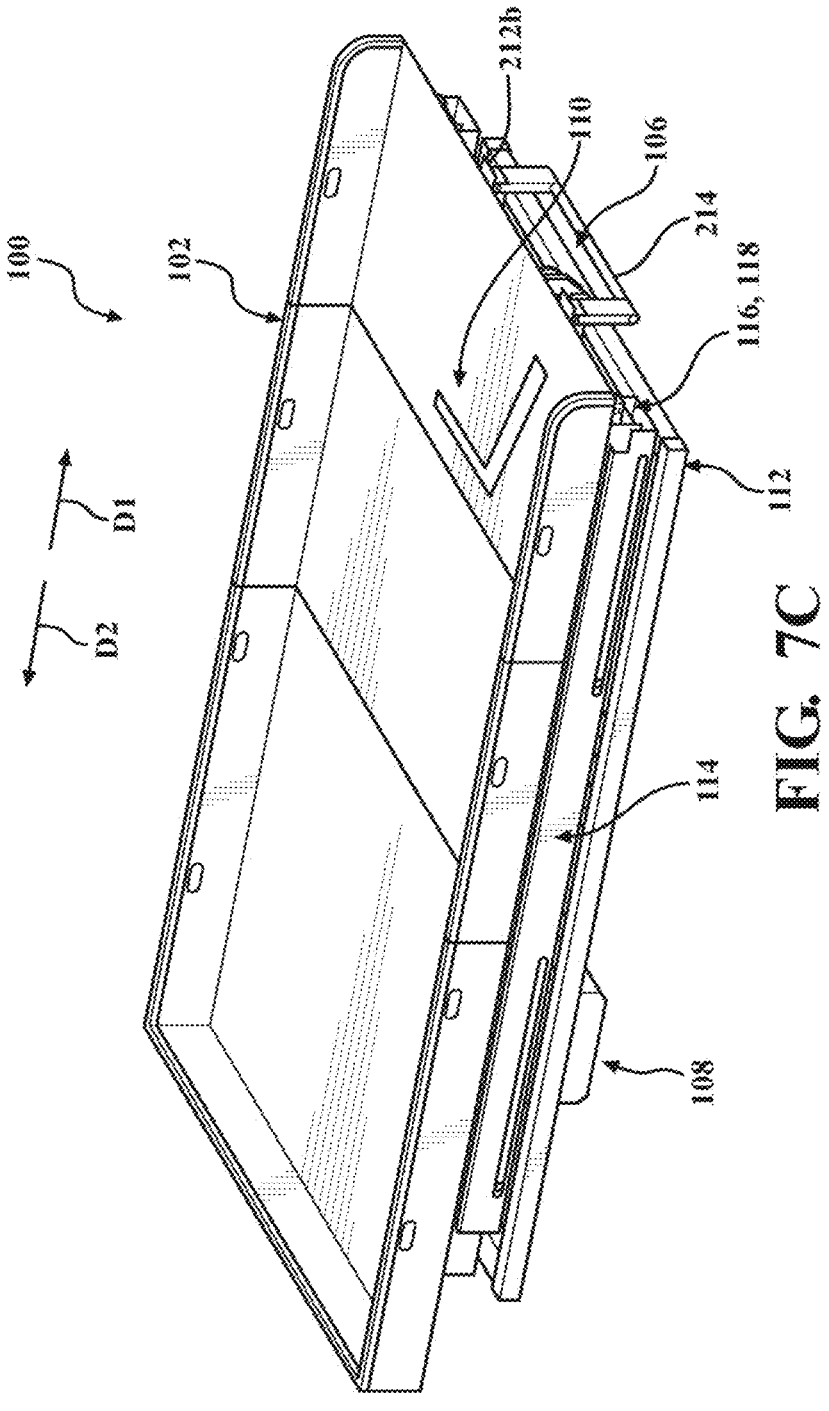

In FIGS. 7B and 7C, the locking bar 106 is moved to the unlocked position, whereby the locking bar handle 214 is pulled in the first direction D1 from the cargo lift system 100 (FIG. 7B) and is pivoted downward about the second locking bar joint 212b (FIG. 7C). As discussed previously, moving the locking bar 106 to the unlocked position causes the locking bar joints 212a, 212b to align with the second deck frame joint 178b along the vertical direction. In other words, in the unlocked position, the first locking bar joint 212a and the second deck frame joint 178b are coextensive to allow the deck system 102 to articulate.

Figure 7D:
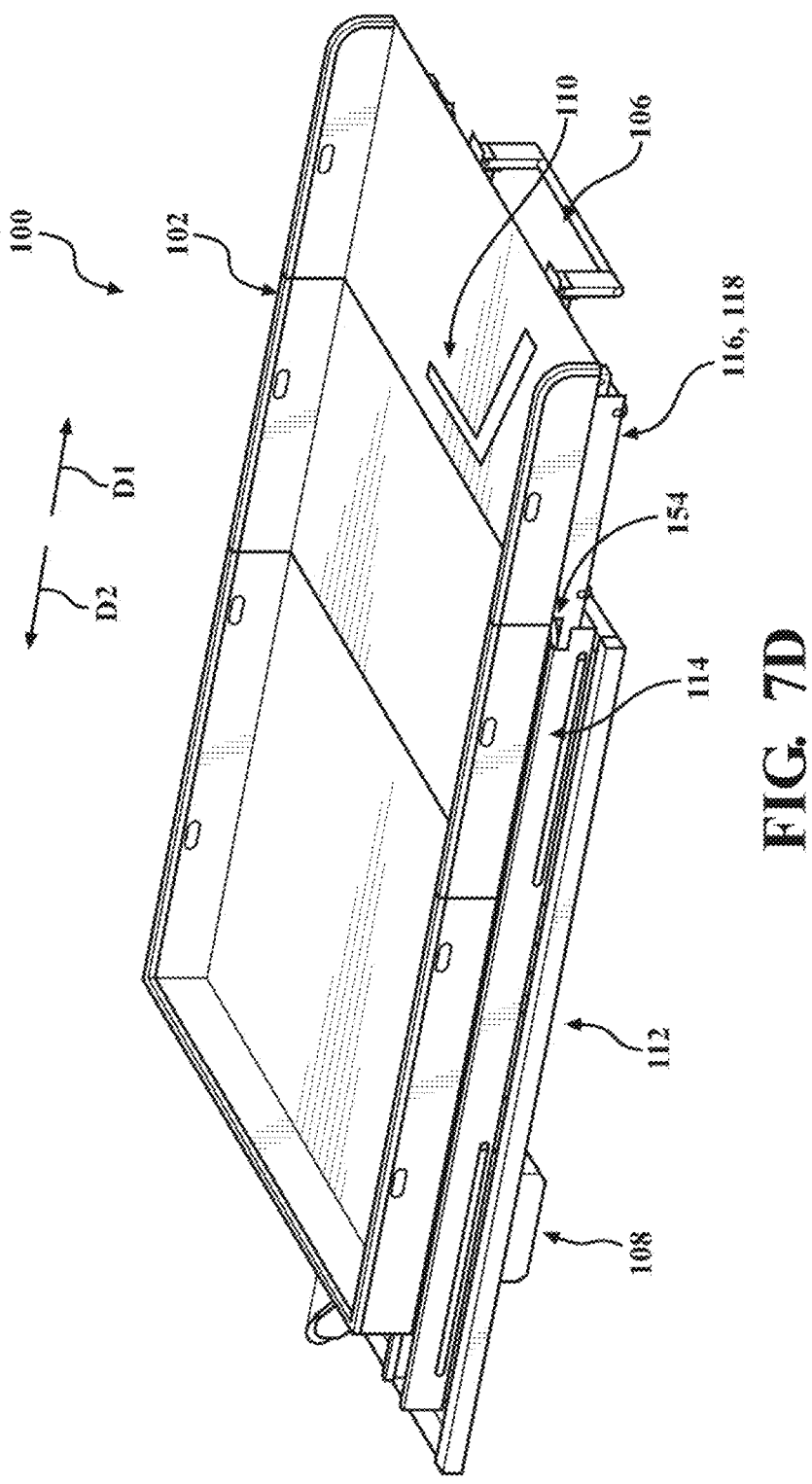

FIG. 7D shows a primary deployment step of the articulating deployment mode, whereby the cargo lift system 100 is biased in the first direction D1 by the actuator system 108. Here, the intermediate rails 116 initially translate in the first direction D1 relative to the base rails 114. However, as discussed previously, relative movement between the deck system 102 and the intermediate rails 116 is restricted by the retainers 154, whereby the deck system 102 moves with the intermediate rails 116 in the first direction D1. With reference to FIG. 5A, when the intermediate rails 116 are fully retracted within the base rails 114, the base rail sidewalls 132 bias against the bumps of the retainers 154 formed by the second arcuate spring segments 168 to bias the second ends 158 of the retainer 154 inwardly towards the centerline of the respective intermediate rails 116. When biased inwardly, the catches 164 formed at the second ends 158 of the retainers 154 engage or "catch" ends of the deck frame walls 186. Thus, the catches 164 prevent the deck frame walls 186 from moving past the retainers in the first direction D1 when the retainers 154 are biased inwardly, thereby causing the deck system 102 to move synchronously with the intermediate rails 116 through the initial deployment step of FIG. 7D.

In the initial deployment position of FIG. 7D, the first and second deck frame segments 176a, 176b and the first and second platform panels 196a, 196b are supported within the cargo area 14 by the base rails 114 while the second ends of the intermediate rails 116 and third deck frame segment 176c are cantilevered from the second ends 128 of the base rails 114. Particularly, the third deck frame segment 176c and the third platform panel 196c are supported above the bumper 18 by the length of the intermediate rails 116 between the second end 142 and the intermediate rail notch 188. In other words, the third deck frame segment 176c and the third platform panel 196c are also cantilevered from the second ends 128 of the base rails 114. Thus, by restricting movement of the deck system 102 relative to the intermediate rails 116 until the intermediate rails 116 move to the initial deployment position (FIG. 7D), the deck system 102 is supported above and cantilevered over the rear bumper 18 to avoid impact or interference with the rear bumper 18, particularly in the articulating deployment mode.

When the deck system 102 is moved to the initial deployment position shown in FIG. 7D, the retainers 154 of the intermediate rails 116 move in the first direction D1 within the base rail channel 136 and into alignment with the base rail notches 134 formed at the second ends 128 of the base rails 114. Thus, the base rail sidewalls 132 function to constrain the retainers 154 in the inwardly-biased state through the initial deployment step until the retainers 154 are aligned with the base rail notches 134. When the retainers 154 are aligned with the base rail notches 134, the natural biasing force of the spring portion 162 causes the spring portion 162 and the catch 164 to move outwardly in the third direction D3 and into the base rail notches 134, as shown in FIG. 5B. When the catches 164 move outwardly, the catches 164 disengage the deck frame walls 186 of the deck frame 118, thereby allowing the deck frame 118 to pass between the catches 164 and to move in the first direction D1 relative to the intermediate rail 116.

Figure 7E:
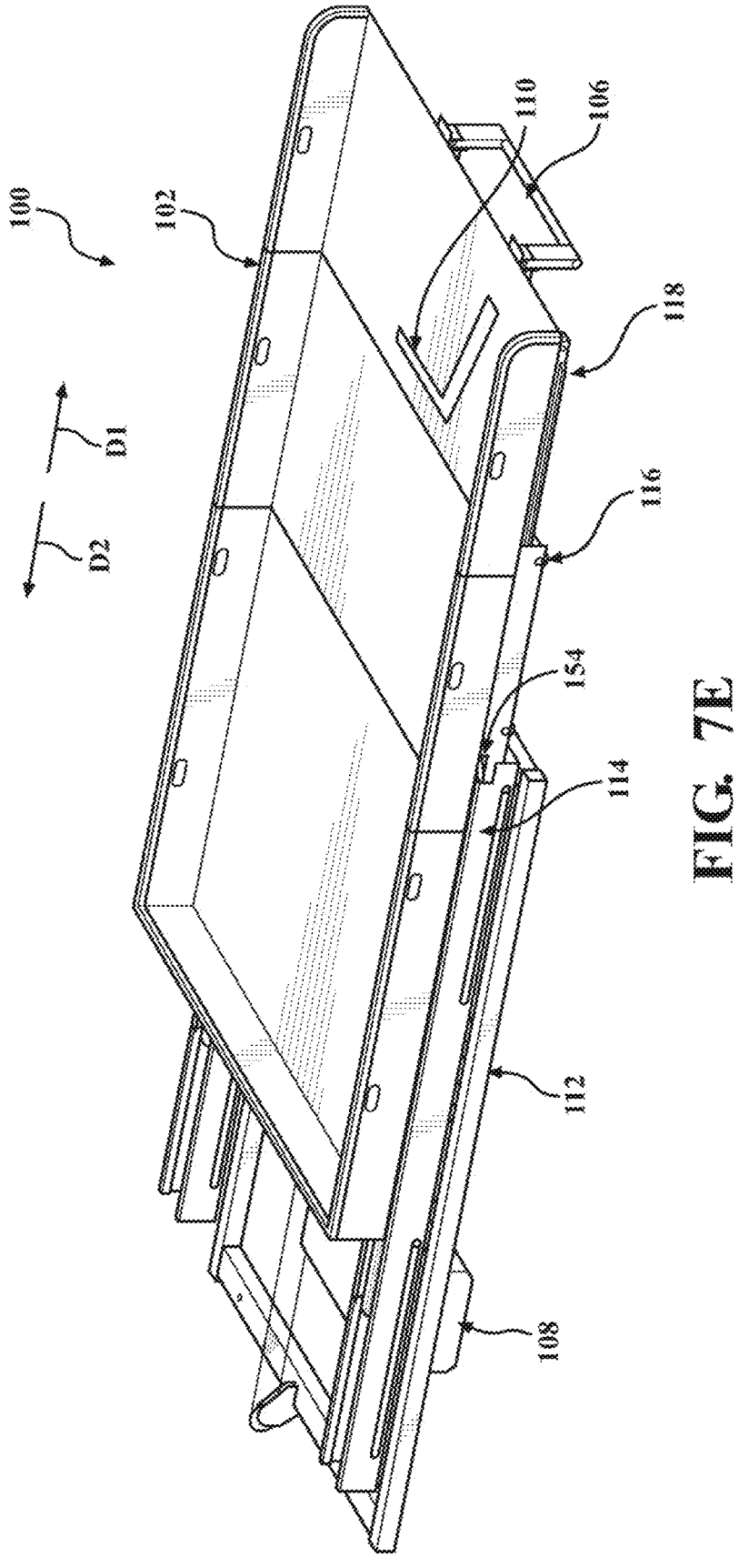
Figure 7F:
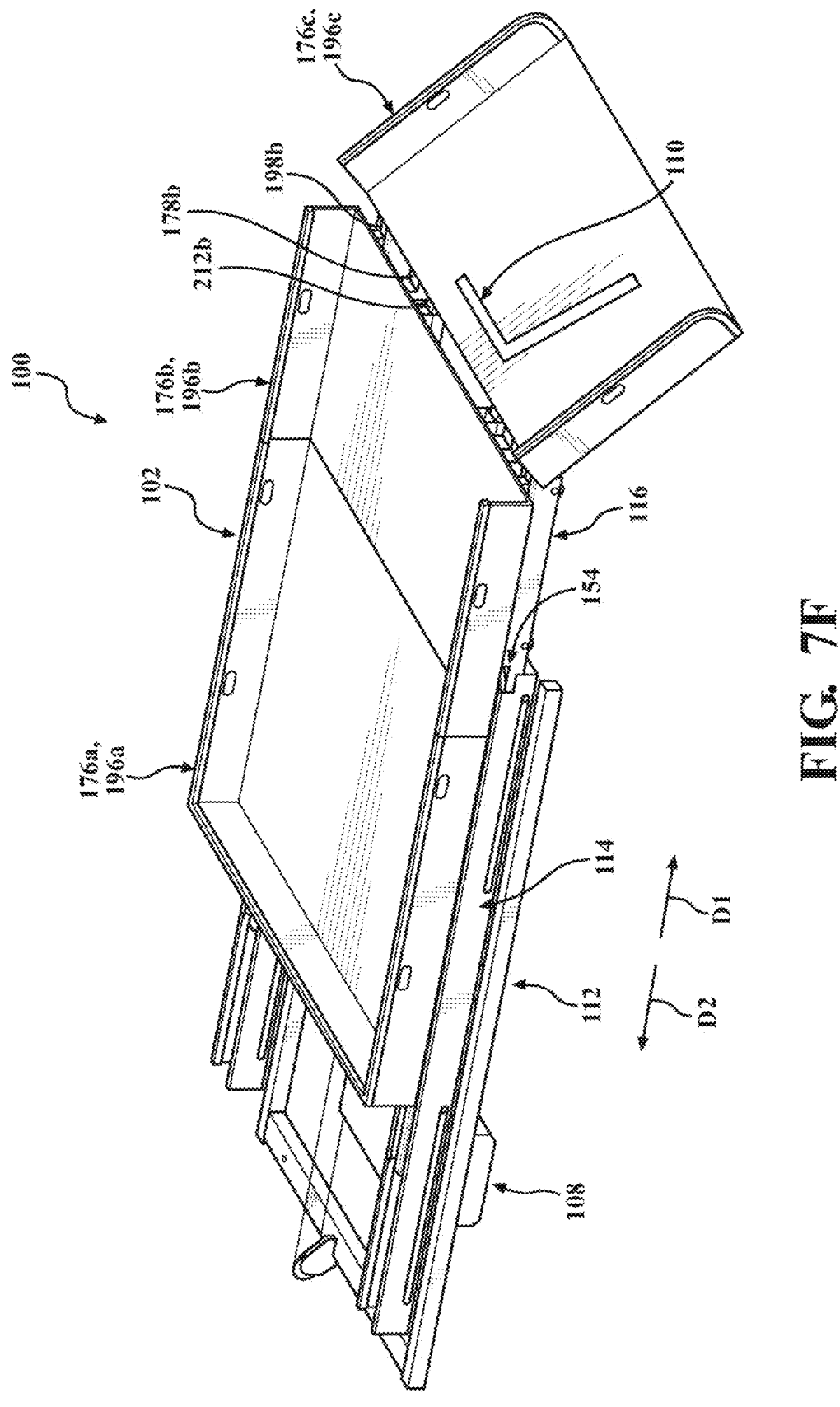

As shown in FIGS. 7E and 7F, when the retainers 154 move outwardly to the unlocked state, the deck system 102 is able to move through a secondary deployment step to a secondary deployment position where the intermediate rail 116 is extended relative to the base rail 114 and the deck system 102 is extended relative to the intermediate rail 116. In the secondary deployment position, the second deck frame joint 178b is aligned with the second ends 142 of the intermediate rails 116, whereby the first and second deck frame segments 176a, 176b and the first and second platform panels 196a, 196b are supported above the intermediate rail 116 while the third deck frame segment 176c and the third platform panel 196c are cantilevered from the intermediate rail 116. In the articulating deployment mode, the third deck frame segment 176c and the third platform panel 196c are able to pivot about the first locking bar joint 212a and the second deck frame joint 178b. Thus, the third deck frame segment 176c and the third platform panel 196c pivot towards the ground surface to a first articulated position, as shown in FIG. 7F.

Figure 7G:
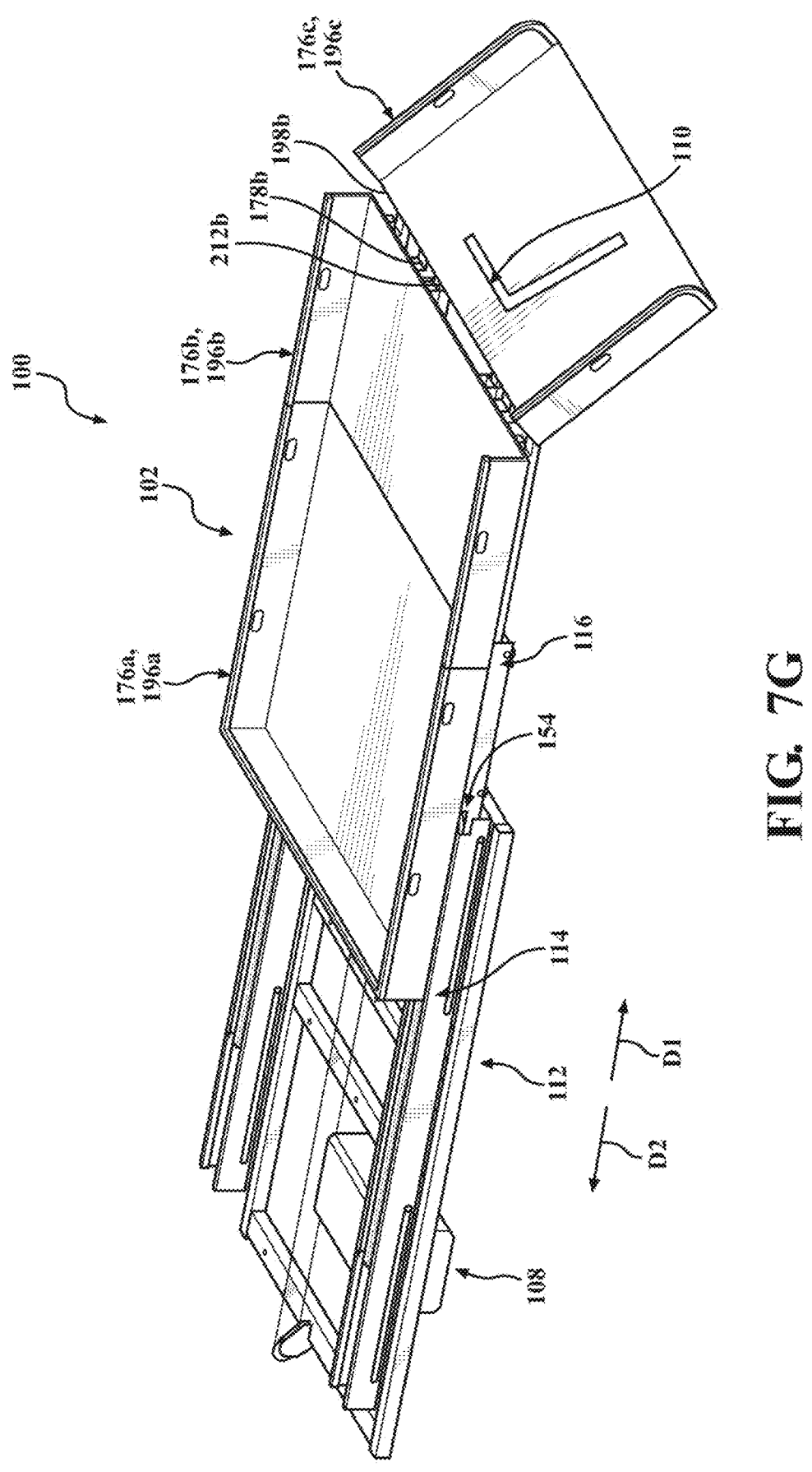
Figure 7H:
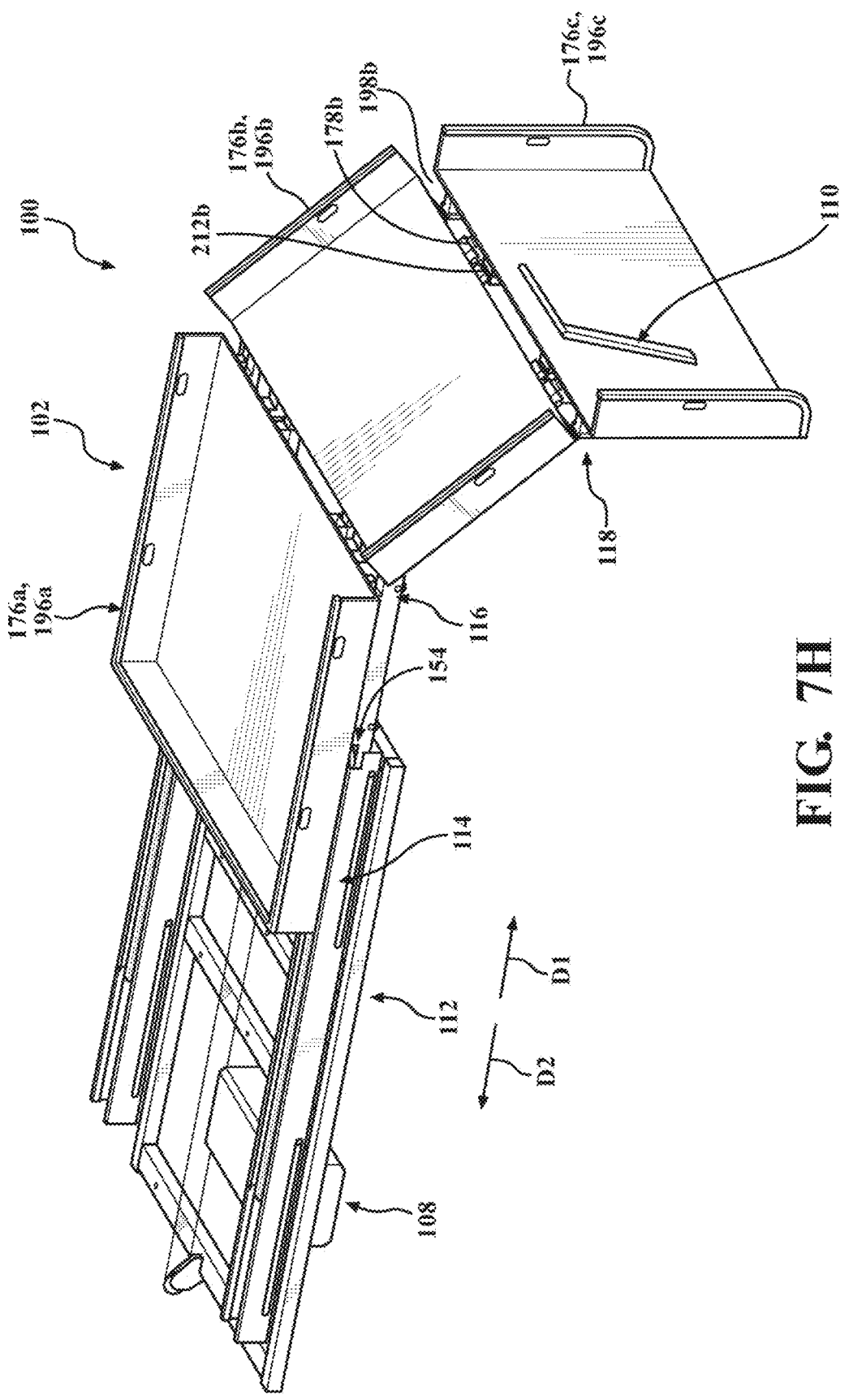

In FIGS. 7G and 7H, the deck system 102 is moved to a fully deployed state. In the fully deployed state, the first deck frame joint 178a is aligned with the second ends 142 of the intermediate rails 116, whereby the first deck frame segment 176a and the first platform panel 196a are supported above the intermediate rail 116 while the second and third deck frame segments 176b, 176c and the second and third platform panels 196b, 196c are cantilevered from the intermediate rail 116. In the articulating deployment mode, the second deck frame segment 176b and the second platform panel 196b are able to pivot about the first deck frame joint 178a, as distal ends of the locking bar side members 210a, 210b of the first locking bar frame segment 208a are aligned with the first deck frame joint 178a. Thus, the third deck frame segment 176c and the third platform panel 196c pivot to a second articulated position adjacent to the ground surface supporting the vehicle 10, as shown in FIG. 7H.

Figure 7I:
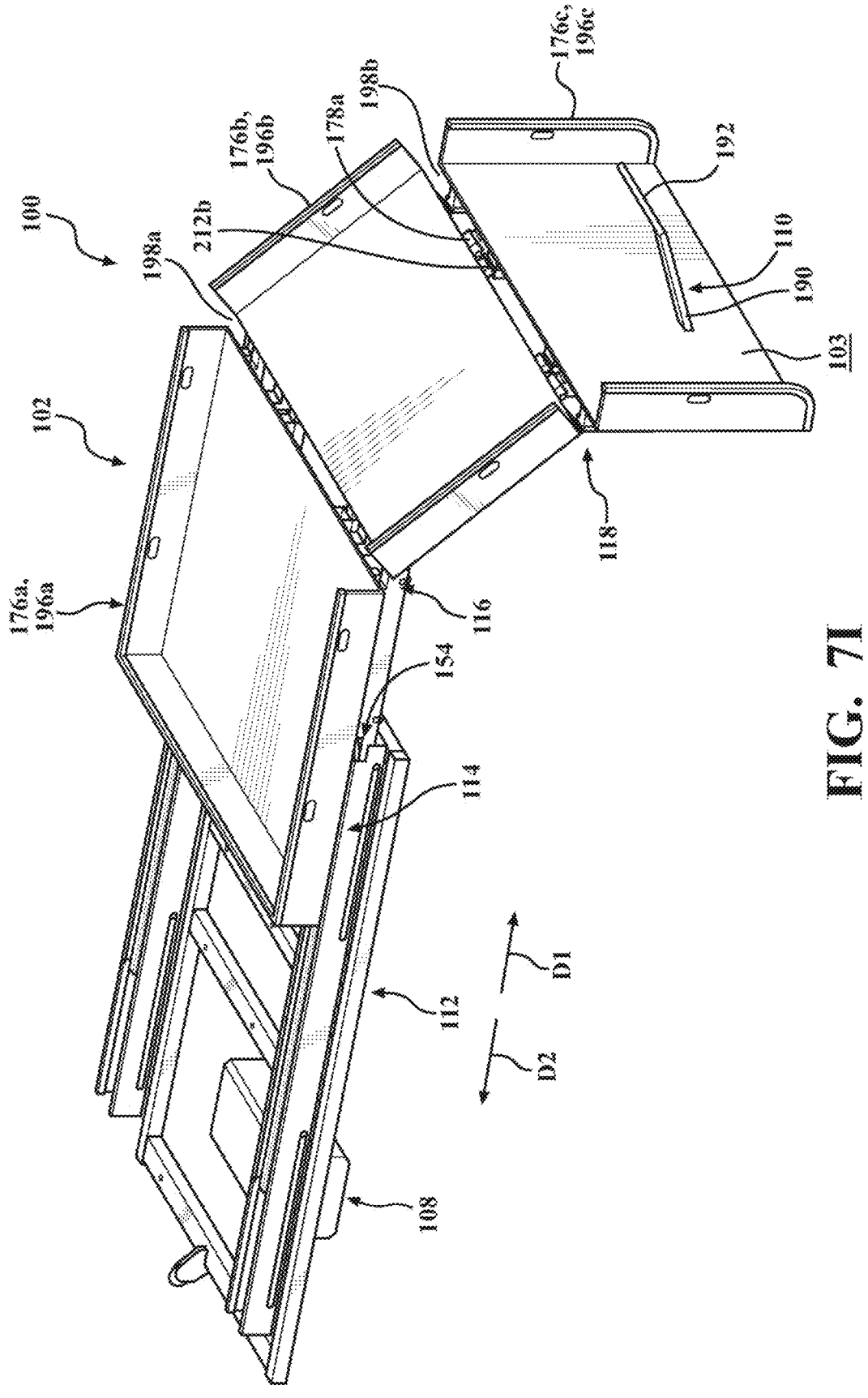

At FIG. 7I, the cargo hook 110 transitions from the retracted state to the extended state. While the illustrated example of the cargo hook 110 extends under the force of gravity, the cargo hook 110 may be powered for movement between the extended state and the retracted state. In the extended state, the cargo hook upper arm 192 is spaced apart from the upper support surface 103, whereby a cargo item or wheelchair can be attached to the cargo hook 110.

To return to the stowed state with the cargo item or wheelchair, the operations described above are reversed. Particularly, the deck system 102 is moved in the second direction D2 relative to the intermediate rail 116 to return the cargo lift system 100 to the secondary deployment position (FIG. 7E) and then to the initial deployment position (FIG. 7C). Once the deck system 102 is fully retracted relative to the intermediate rail 116, a force applied to the deck system 102 in the second direction D2 biases the intermediate rail 116 in the second direction D2, whereby the retainers are forced in the second direction D2 towards the base rail sidewalls 132. The first arcuate spring segments 166 of the retainers 154 contact respective ends of the base rail sidewalls 132 and the ends of the base rail sidewalls 132 bias the spring portion 162 of the retainers 154 inwardly in the fourth direction D4 (FIG. 5A). Here, the bumps associated with the second arcuate spring segments 168 are biased inwardly by the base rail sidewalls 132 to move the catches 164 inwardly, where the catches 164 re-engage the deck frame walls 186 (FIG. 5A).

Figure 8:
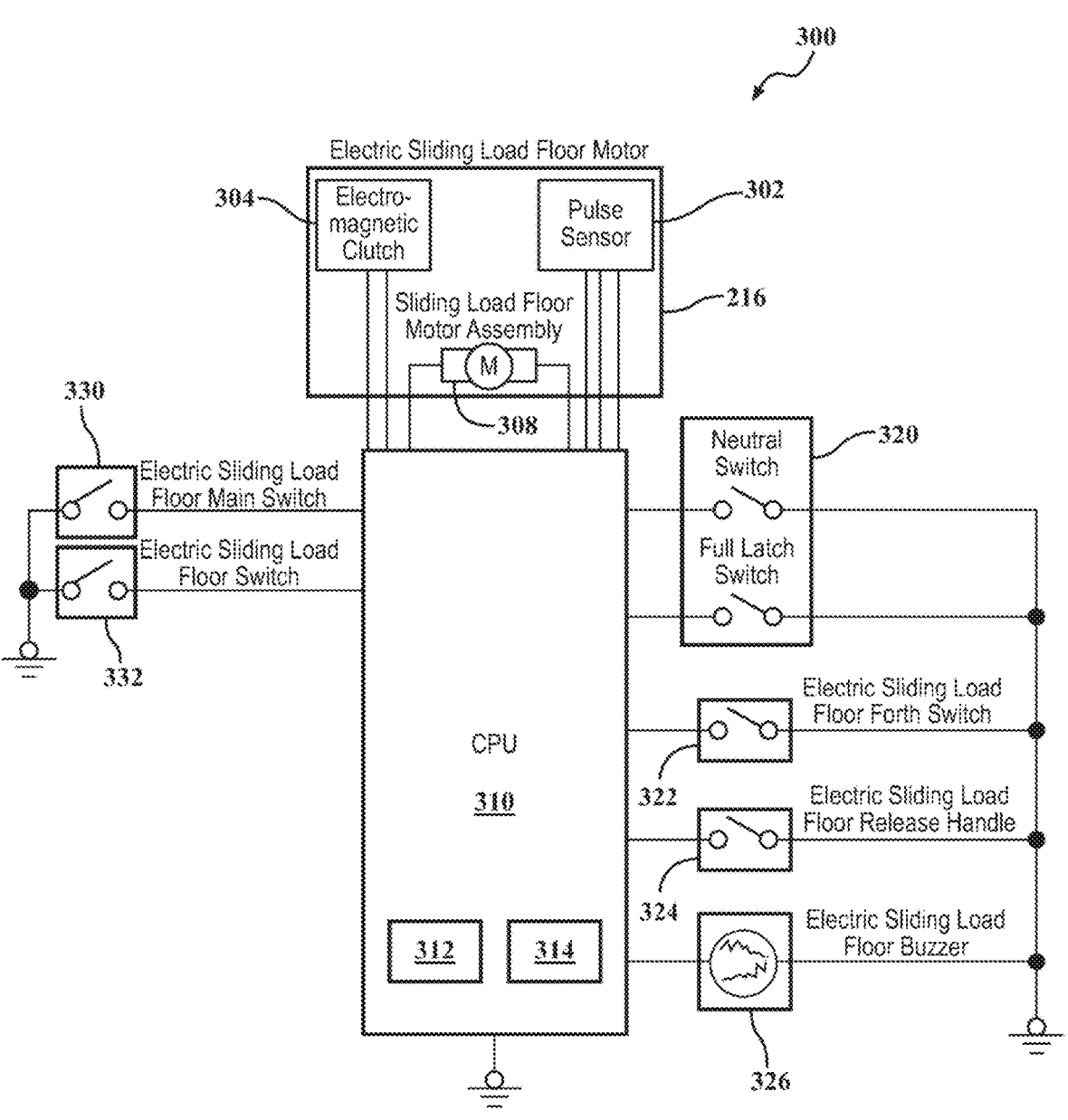
FIG. 8 is a schematic layout of a control unit for operating the cargo lift system of FIG. 1.

FIG. 8 shows an example control system 300 for operating the cargo lift system 100 using the actuator system 108. The control system 300 includes the electric sliding floor motor 216 of the actuator system 108. In the illustrated example, the motor 216 includes a pulse sensor 302, an electromagnetic clutch 304, and a sliding load floor motor assembly 308, each connected to a central processing unit (CPU) 310 having a processor 312 and memory hardware 314. The control system 300 further includes a plurality of switches and peripheral devices, including a neutral switch and a full latch switch 320, a forth switch 322, a release switch 324, a buzzer 326, a main switch 330, and a floor switch 332.

Figure 9:
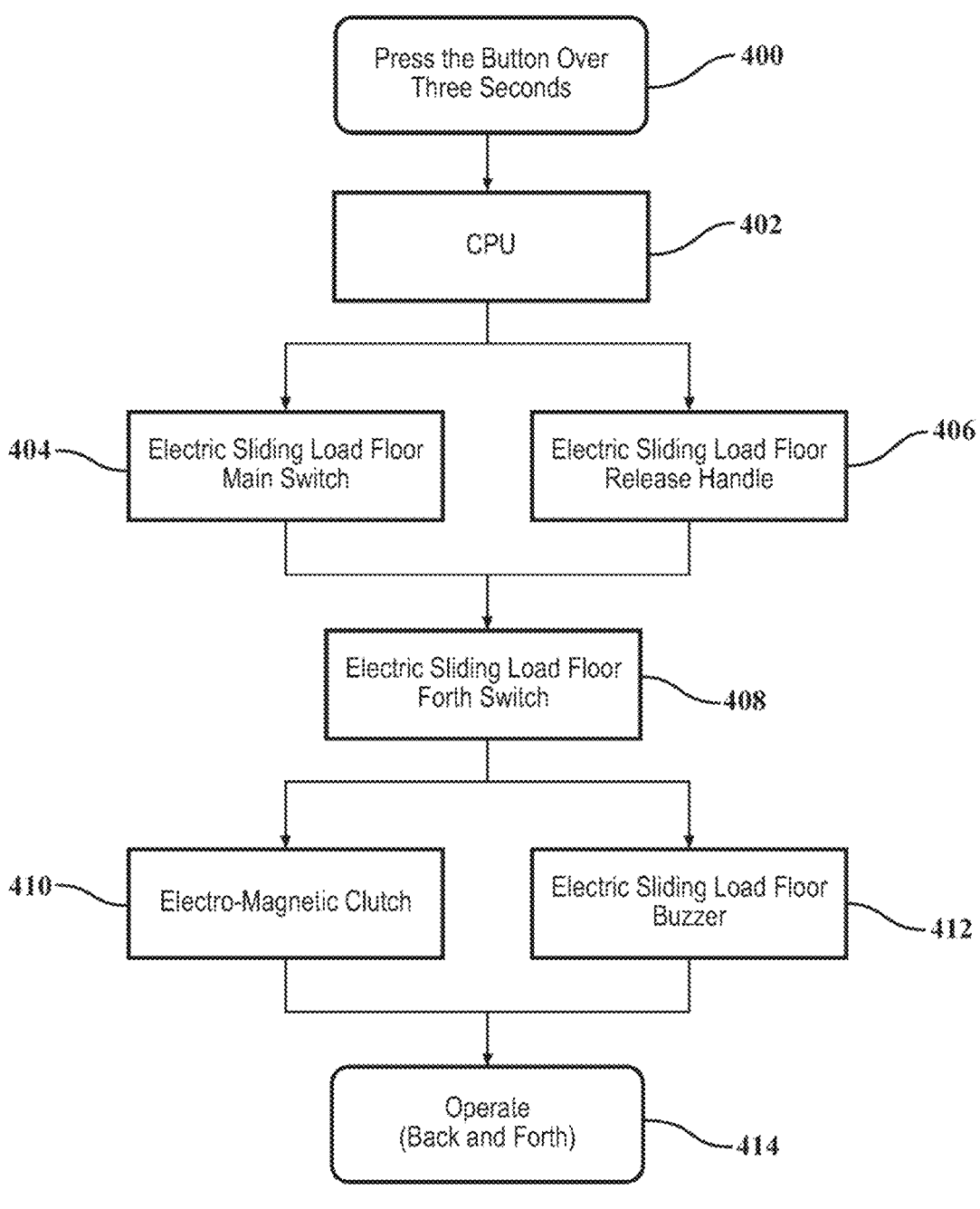
FIG. 9 is an example order of operations for using the control unit of FIG. 8 to operate the cargo lift system of FIG. 1.

FIG. 9 shows an example order of operations for controlling the cargo lift system 100 using the control system 300. For example, in a first operation 400, a user presses an actuation button for a threshold period of time (e.g., three seconds). The actuation button may be an existing button of a vehicle key fob, such as a hatch-open button. By configuring the CPU 310 to recognize a threshold period of time associated with depression of the existing button, complexity of the key fob can be minimized by avoiding the need for additional buttons. While a three-second period is provided as an example, other time thresholds may be utilized for operating the cargo lift system 100. Thus, the button of the key fob may be described as being a dual-purpose button operable to send first instructions for operating a first function of the vehicle 10 (e.g., lock, hatch, engine start) when engaged for a first period of a time less than the threshold time period and to send second instructions for operating the cargo lift system 100 when engaged for a second period of time that is greater than the threshold period of time.

Upon receiving the actuation signal from the key fob, the CPU 310, at operation 402, sends instructions to the main switch 320 and the release switch 324 to provide power to the cargo lift system 100 and to release one or more latches or locks that secure the position of the cargo lift system 100 at operations 404 and 406, respectively. At operation 408, the forth switch 322 is actuated to cause the actuator motor 216 to operate. At operations 410 and 412, the electromagnetic clutch 304 and the buzzer 412 may be operated to engage the actuator drive 218 and to warn users that the cargo lift system 100 is active. At operation 414, the CPU 310 instructs the cargo lift system 100 to operate between the stowed configuration and the deployed configuration.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A cargo lift system for a vehicle, the cargo lift system comprising:

a frame system configured to be attached to the vehicle;

a deck system including a deck frame having a plurality of deck frame segments, the deck system operable to translate along the frame system in (i) a first deployment mode where the deck frame segments cooperate to define a rigid support platform and (ii) a second deployment mode where the deck frame segments articulate to a lift position adjacent to a ground surface associated with the vehicle; and a cargo hook attached to the deck system and operable to move between an extended state and a retracted state, wherein the frame system includes a base frame configured to be attached to the vehicle, a base rail attached to the base frame, and an intermediate rail slidably attached to the base rail.

2. The cargo lift system of claim 1, wherein the plurality of deck frame segments are slidably attached to the intermediate rail.

3. The cargo lift system of claim 2, wherein the plurality of deck frame segments includes a first deck frame segment slidably attached to the intermediate rail, a second deck frame segment attached to the first deck frame segment and configured to slide along the intermediate rail and articulate relative to the first deck frame segment, and a third deck frame segment attached to the second deck frame segment and configured to slide along the intermediate rail and articulate relative to the second deck frame segment.

4. The cargo lift system of claim 3, wherein the second deck frame segment is pivotally attached to the first deck frame segment at a first deck frame joint and the third deck frame segment is pivotally attached to the second deck frame segment at a second deck frame joint.

5. The cargo lift system of claim 4, further comprising an actuator system operable to translate the deck system along the frame system.

6. The cargo lift system of claim 4, wherein the intermediate rail includes a retainer operable between a first position to restrict movement of the deck frame relative to the intermediate rail and a second position to permit movement of the deck frame relative to the intermediate rail.

7. The cargo lift system of claim 6, wherein the retainer is operable to permit movement of the intermediate rail relative to the base rail in the first position and to restrict movement of the intermediate rail relative to the base rail in the second position.

8. The cargo lift system of claim 6, further comprising a control system operable to instruct the cargo lift system to move between a deployed configuration and a stowed configuration.

9. The cargo lift system of claim 8, wherein the control system includes a key fob including a dual-purpose button operable to send first instructions for operating the vehicle when engaged for a first period of time and to send instructions for operating the cargo lift system when engaged for a second period of time that is longer than the first period of time.

10. A vehicle including a cargo lift system comprising:

a frame system configured to be attached to the vehicle;

a deck system including a deck frame having a plurality of deck frame segments, the deck system operable to translate along the frame system in (i) a first deployment mode where the deck frame segments cooperate to define a rigid support platform and (ii) a second deployment mode where the deck frame segments articulate to a lift position adjacent to a ground surface associated with the vehicle; and a cargo hook attached to the deck system and operable to move between an extended state and a retracted state, wherein the frame system includes a base frame configured to be attached to the vehicle, a base rail attached to the base frame, and an intermediate rail slidably attached to the base rail.

11. The vehicle of claim 10, wherein the plurality of deck frame segments are slidably attached to the intermediate rail.

12. The vehicle of claim 11, wherein the plurality of deck frame segments includes a first deck frame segment slidably attached to the intermediate rail, a second deck frame segment attached to the first deck frame segment and configured to slide along the intermediate rail and articulate relative to the first deck frame segment, and a third deck frame segment attached to the second deck frame segment and configured to slide along the intermediate rail and articulate relative to the second deck frame segment.

13. The vehicle of claim 12, wherein the second deck frame segment is pivotally attached to the first deck frame segment at a first deck frame joint and the third deck frame segment is pivotally attached to the second deck frame segment at a second deck frame joint.

14. The vehicle of claim 13, further comprising an actuator system operable to translate the deck system along the frame system.

15. The vehicle of claim 13, wherein the intermediate rail includes a retainer operable between a first position to restrict movement of the deck frame relative to the intermediate rail and a second position to permit movement of the deck frame relative to the intermediate rail.

16. The vehicle of claim 15, wherein the retainer is operable to permit movement of the intermediate rail relative to the base rail in the first position and to restrict movement of the intermediate rail relative to the base rail in the second position.

17. The vehicle of claim 15, further comprising a control system operable to instruct the cargo lift system to move between a deployed configuration and a stowed configuration.

18. The vehicle of claim 17, wherein the control system includes a key fob including a dual-purpose button operable to send first instructions for operating the vehicle when engaged for a first period of time and to send instructions for operating the cargo lift system when engaged for a second period of time that is longer than the first period of time.

* * * * *